US008945694B2

(12) United States Patent
Aneja et al.

(10) Patent No.: US 8,945,694 B2
(45) Date of Patent: *Feb. 3, 2015

(54) POLY ARYL ETHER KETONE POLYMER BLENDS

(75) Inventors: Ashish Aneja, West Chester, PA (US); Robert Russell Gallucci, Mt. Vernon, IN (US); Roy Ray Odle, Mt. Vernon, IN (US); Kapil Chandrakant Sheth, Evansville, IN (US)

(73) Assignee: Sabic Global Technologies B.V. (NL)

( * ) Notice: Subject to any disclaimer, the term of this patent is extended or adjusted under 35 U.S.C. 154(b) by 969 days.

This patent is subject to a terminal disclaimer.

(21) Appl. No.: 11/687,749

(22) Filed: Mar. 19, 2007

(65) Prior Publication Data

US 2007/0197739 A1 Aug. 23, 2007

Related U.S. Application Data

(63) Continuation-in-part of application No. 11/456,449, filed on Jul. 10, 2006, which is a continuation-in-part of application No. 11/229,455, filed on Sep. 16, 2005.

(51) Int. Cl.
C08L 61/00 (2006.01)
C08L 71/00 (2006.01)
C08L 77/00 (2006.01)
C08L 81/00 (2006.01)
C08L 71/10 (2006.01)

(52) U.S. Cl.
CPC .................................. *C08L 71/10* (2013.01)
USPC ....... 428/35.7; 428/473.5; 524/538; 524/542; 525/66; 525/153; 525/180; 525/183; 525/420; 525/432; 525/436

(58) Field of Classification Search
USPC ............ 524/538, 542; 525/66, 153, 180, 183, 525/420, 432, 436; 428/35.7, 473.5
See application file for complete search history.

(56) References Cited

U.S. PATENT DOCUMENTS

| | | |
|---|---|---|
| 2,991,273 A | 7/1961 | Hechelhammer et al. |
| 2,999,835 A | 9/1961 | Goldberg |
| 3,028,365 A | 4/1962 | Schnell et al. |
| 3,065,205 A | 11/1962 | Bonner, Jr. |
| 3,148,172 A | 9/1964 | Fox |
| 3,153,008 A | 10/1964 | Fox |
| 3,224,043 A | 12/1965 | Lameris et al. |
| 3,271,367 A | 9/1966 | Schnell et al. |
| 3,271,368 A | 9/1966 | Goldberg et al. |
| 3,302,243 A | 2/1967 | Ludwig |
| 3,383,092 A | 5/1968 | Cazier |
| 3,634,355 A | 1/1972 | Barr et al. |
| 3,671,487 A | 6/1972 | Abolins |
| 3,723,373 A | 3/1973 | Lucas |
| 3,803,085 A | 4/1974 | Takehoshi et al. |
| 3,847,867 A | 11/1974 | Heath |
| 3,852,242 A | 12/1974 | White |
| 3,905,942 A | 9/1975 | Takekoshi et al. |
| 3,915,608 A | 10/1975 | Hujik |
| 3,972,902 A | 8/1976 | Heath et al. |
| 3,983,093 A | 9/1976 | Williams, III et al. |
| 3,986,477 A | 10/1976 | Bigland |
| 4,008,203 A | 2/1977 | Jones |
| 4,038,237 A | 7/1977 | Snyder |
| 4,108,837 A | 8/1978 | Johnson et al. |
| 4,109,365 A | 8/1978 | Tygart |
| 4,154,775 A | 5/1979 | Axelrod |
| 4,175,175 A | 11/1979 | Johnson et al. |
| 4,176,222 A | 11/1979 | Cinderey et al. |
| 4,199,314 A | 4/1980 | Lupke et al. |
| 4,217,438 A | 8/1980 | Brunelle et al. |
| 4,293,670 A | 10/1981 | Robeson et al. |
| 4,334,053 A | 6/1982 | Freitag et al. |
| 4,345,363 A | 8/1982 | Leuchs et al. |
| 4,346,737 A | 8/1982 | Miller |
| 4,374,530 A | 2/1983 | Walling |
| 4,396,755 A | 8/1983 | Rose |
| 4,398,020 A | 8/1983 | Rose |
| 4,404,350 A | 9/1983 | Ryang |
| 4,414,355 A | 11/1983 | Pokorny |
| 4,430,485 A | 2/1984 | Mark |
| 4,443,591 A | 4/1984 | Schmidt et al. |
| 4,454,275 A | 6/1984 | Rosenquist |
| 4,455,410 A | 6/1984 | Giles, Jr. |
| 4,532,094 A | 7/1985 | Wu et al. |
| 4,548,997 A | 10/1985 | Mellinger et al. |
| 4,588,546 A | 5/1986 | Feil et al. |
| 4,687,819 A | 8/1987 | Quinn et al. |
| 4,690,997 A | 9/1987 | Cella et al. |
| 4,698,001 A | 10/1987 | Vismara |

(Continued)

FOREIGN PATENT DOCUMENTS

| | | |
|---|---|---|
| CA | 847963 A | 7/1970 |
| EP | 0138129 | 4/1985 |

(Continued)

OTHER PUBLICATIONS

SABIC Innovative Plastics "Extem Resins"; Product Literature; p. 1-40; 2008.

(Continued)

*Primary Examiner* — Ana Woodward

(74) *Attorney, Agent, or Firm* — Cantor Colburn LLP; Diderico van Eyl

(57) ABSTRACT

Filled phase-separated blends of polyaryl ether ketones, polyaryl ketones, polyether ketones, polyether ether ketones and mixtures thereof with at least one polysulfone etherimide, wherein the polysulfone etherimide has greater than or equal to 50 mole % of the polymer linkages contain at least one aryl sulfone group are described. Such filled blends have improved load-bearing capability at high temperature. In another aspect the filled blends have a higher crystallization temperature, especially at fast cooling rates.

17 Claims, 1 Drawing Sheet

(56) References Cited

U.S. PATENT DOCUMENTS

| | | |
|---|---|---|
| 4,808,686 A | 2/1989 | Cella et al. |
| 4,816,527 A | 3/1989 | Rock |
| 4,900,502 A | 2/1990 | Babcock et al. |
| 4,906,784 A | 3/1990 | Skoler |
| 4,908,418 A | 3/1990 | Holub |
| 4,908,419 A | 3/1990 | Holub et al. |
| 4,914,175 A | 4/1990 | Choe |
| 4,941,289 A | 7/1990 | Harris |
| 4,959,423 A | 9/1990 | Harris et al. |
| 4,965,310 A | 10/1990 | Harris et al. |
| 4,985,313 A | 1/1991 | Penneck et al. |
| 5,047,487 A | 9/1991 | Camargo et al. |
| 5,051,483 A | 9/1991 | Rock et al. |
| 5,068,353 A | 11/1991 | Dellacoletta |
| 5,079,309 A | 1/1992 | Harris et al. |
| 5,106,915 A | 4/1992 | Rock et al. |
| 5,110,880 A | 5/1992 | Harris et al. |
| 5,151,147 A | 9/1992 | Foster et al. |
| 5,151,462 A | 9/1992 | El-Hibri et al. |
| 5,171,796 A | 12/1992 | Harris et al. |
| 5,189,115 A | 2/1993 | Melquist |
| 5,189,137 A | 2/1993 | Howson et al. |
| 5,204,400 A | 4/1993 | Kelly et al. |
| 5,229,482 A | 7/1993 | Brunelle |
| 5,387,639 A | 2/1995 | Sybert et al. |
| 5,514,813 A | 5/1996 | Brunelle |
| 5,521,258 A | 5/1996 | Cooper et al. |
| 5,551,860 A | 9/1996 | Budzynski et al. |
| 5,830,974 A | 11/1998 | Schmidhauser et al. |
| 5,851,837 A | 12/1998 | Stokes et al. |
| 5,856,421 A | 1/1999 | Schmidhauser |
| 5,908,915 A | 6/1999 | Brunelle |
| 5,916,997 A | 6/1999 | Webb et al. |
| 5,986,016 A | 11/1999 | Puyenbroek et al. |
| 6,011,122 A | 1/2000 | Puyenbroek |
| 6,020,456 A | 2/2000 | Brunelle et al. |
| 6,072,010 A | 6/2000 | Puyenbroek |
| 6,114,472 A | 9/2000 | Matsuki et al. |
| 6,228,467 B1 | 5/2001 | Taniguchi et al. |
| 6,235,866 B1 | 5/2001 | Khouri et al. |
| 6,265,521 B1 | 7/2001 | Fyvie et al. |
| 6,310,145 B1 | 10/2001 | Puyenbroek et al. |
| 6,403,669 B1 | 6/2002 | Camberlin et al. |
| 6,482,880 B1 | 11/2002 | Rock |
| 6,499,217 B1 | 12/2002 | Yamada et al. |
| 6,531,568 B1 | 3/2003 | Shibuya et al. |
| 6,610,794 B1 | 8/2003 | Sakurai et al. |
| 6,627,303 B1 | 9/2003 | Gallucci et al. |
| 6,737,454 B2 | 5/2004 | Seidel et al. |
| 6,824,884 B2 | 11/2004 | Taniguchi et al. |
| 6,840,202 B2 | 1/2005 | Simpson |
| 6,849,706 B1 | 2/2005 | Brunelle et al. |
| 6,863,852 B1 | 3/2005 | Ballard et al. |
| 6,905,150 B2 | 6/2005 | Carcagno et al. |
| 6,919,422 B2 | 7/2005 | Gallucci et al. |
| 6,920,900 B2 | 7/2005 | Friedrich |
| 6,942,016 B2 | 9/2005 | Kobayashi et al. |
| 2001/0016626 A1 | 8/2001 | Vollenberg et al. |
| 2003/0004268 A1 | 1/2003 | Sundararaj et al. |
| 2004/0110879 A1 | 6/2004 | Seidel et al. |
| 2004/0232598 A1 | 11/2004 | Donea et al. |
| 2005/0070684 A1* | 3/2005 | Gallucci et al. ............ 528/170 |
| 2005/0288406 A1 | 12/2005 | Gallucci et al. |
| 2007/0065615 A1 | 3/2007 | Odle et al. |
| 2007/0066737 A1 | 3/2007 | Gallucci et al. |
| 2007/0066739 A1 | 3/2007 | Odle et al. |
| 2007/0066740 A1 | 3/2007 | Odle et al. |
| 2007/0066741 A1 | 3/2007 | Donovan et al. |
| 2007/0066765 A1 | 3/2007 | Aneja et al. |
| 2007/0197739 A1 | 8/2007 | Aneja et al. |
| 2007/0219324 A1 | 9/2007 | Aneja et al. |

FOREIGN PATENT DOCUMENTS

| | | | |
|---|---|---|---|
| EP | 0158732 A1 | | 10/1985 |
| EP | 0163464 A1 | | 12/1985 |
| EP | 0254488 A2 | | 1/1988 |
| EP | 0594386 A1 | | 4/1994 |
| EP | 0307670 B1 | | 9/1994 |
| EP | 0631862 A1 | | 1/1995 |
| EP | 0704487 A1 | | 4/1996 |
| EP | 0519657 B1 | | 5/1996 |
| EP | 0850992 A1 | | 7/1998 |
| EP | 0881263 A1 | | 12/1998 |
| GB | 2043083 | | 10/1980 |
| GB | 2203744 | | 10/1988 |
| JP | 6411131 U | | 1/1989 |
| JP | 7-145321 | * | 6/1995 |
| JP | 07-145321 | * | 6/1995 |
| JP | 07-145321 A | | 6/1995 |
| WO | 8905332 | | 6/1989 |
| WO | 9410245 | | 5/1994 |
| WO | 0026275 | | 5/2000 |
| WO | WO2005030839 | | 4/2005 |
| WO | 2006012250 A1 | | 2/2006 |

OTHER PUBLICATIONS

JP07188545 A2; English Abstract; Date of Publication Jul. 25, 1995; 1 page.
JP21146590 A2; English Abstract; Date of Publication May 29, 2001; 1 page.
Brandom et al.; "New Method for Producing High-Performance Thermoplastic Polymeric Foams"; Journal of Applied Polymer Science; John Wiley and Sons, Inc.; vol. 66; No. 8; Nov. 21, 1977; 9 pages.
Encyclopedia of Chemical Technology; Third Edition; vol. 16; John Wiley & Sons; New York; 1981; pp. 416-417.
Encyclopedia of Chemical Technology; Third Edition; vol. 18; John Wiley & Sons; New York; 1981; pp. 191-192.
Krause et al.; "Ultralow-k Dielectrics Made by Supercritical Foaming of Thin Polymer Films"; Advanced Materials; vol. 14; No. 15; 2002; 7 pages.
International Search Report of the International Application No. PCT/US2006/047800; International Filing Date Dec. 14, 2006; Date of Mailing Jun. 15, 2007; 5 pages.
Written Opinion of the International Application No. PCT/US2006/047800; International Filing Date Dec. 14, 2006; Date of Mailing Jun. 15, 2007; 8 pages.
International Search Report for the International Patent Application No. PCT/US2006/035726; Date of Filing: Sep. 13, 2006; Date of Mailing: Mar. 16, 2008; 2 pages.
Written Opinion for the International Patent Application No. PCT/US2006/035726; Date of Filing: Sep. 13, 2006; Date of Mailing: Mar. 16, 2008; 5 pages.
International Search Report of International Patent Application No. PCT/US2006/035819; Internationa Filing Date Sep. 14, 2006; Mailing Date Apr. 25, 2007; 4 pages.
Written Opinion of International Application No. PCT/US2006/035819; International Date of Filing Sep. 14, 2006; Date of Mailing Apr. 25, 2007; 4 pages.
International Search Report of International Application No. PCT/US2006/047418; International Filing Date Dec. 12, 2006; Date of Mailing Jun. 22, 2008; 3 pages.
Written Opinion of International Application No. PCT/US2006/047418; International Filing Date Dec. 12, 2006; Date of Mailing Jun. 22, 2008; 5 pages.
Schwartz et al.; "Plastics Materials and Processes"; Van Nostrand Reinhold Company, New York; 1982; pp. 527-563; pp. 632-647; pp. 596-602.
Abstract of JP05-186687; Date of Publication: Jul. 27, 1993; 1 page.
Abstract of JP06-200128; Date of Publication: Jul. 19, 1994; 1 page.
Japanese Patent No. 64-011131; Publication Date: Jan. 13, 1989; Abstract Only; 1 Page.
Bicakci, et al., "Development of Structural Hierarchy During Uniaxial Drawingof PEEK-PEI Blends form Amorphous Precursors", Polymer, 43, 149-157 (2002).

(56) References Cited

OTHER PUBLICATIONS

Blundell et al., "The Morphology of poly(arly-ether-ether-ketone)" Polymer, 24, 953-958 (1983).

Chen, Hsin-Lung, et al., "Phase and Crystallization Behavior of Solution-Blended Poly(ether ether Ketone) and Poly (ether imide)", Polymer Eng. & Sci. 32, 1870-1875 (1992).

Chen, Hsin-Lung, et al., "Melting Behavior of PEEK in its Blends with PEI". J. Poly. Sci. 31, 1845-1850 (1993).

Chen, Hsin-Lung, et al., "Uniaxial Draw of PEEK-PEI blends by Solid-State Coextrusion", Macromolecules, 28, 3981-3924 (1995).

Encyclopdia of Polymer Science and Engineering vol. 12;1989; p. 417.

Harris, et al., "Miscible Blends of Poly(aryl Ether Ketone)s and Polyetherimides", Applied Poly. Sci. 35, 1877-1891 (1988).

Harris, et al., "Isomorphic Behavior of Poly(arly ether ketone) Blends", J. Poly. Sci. Part B: Polymer Physics. 25, 311-323 (1987).

Harris, et al., "Miscible Blends of PEEK & PEI", Polymer Preprints, 28 (1) 56-57 (1987).

Herrmann-Schonherr, et al., "High Performance Polymer Blends. New Compatible Systems", Polymer Preprints, 32 (2), 48-49 (1991).

Hsiao, et al., "Glass Transition, Crystallization, and MorphologyRelationships in Miscible PEAK-PEI Blends", J. Poly. Sci. Part B: Polymer Physics, 32, 901-915 (1993).

Hudson, et al., "Semicrystalline Morphology of Poly(aryl ether ether ketone)/Poly(ether imide) Blends", Macromolecules 1992, 25, 1759-1765.

JP 07-145321 (Machine Translation, claims and detailed description, pp. 1-14).

Japanese Publication No. 07145321, published Jun. 6, 1995, Derwent Abstract Only.

Japanese Patent Application No. JP7-145321 A; Date of Publication Jun. 6, 1995; 18 pages.

Shibata, et al., "Miscibility & Crystallization Behavior of PEEK-PEI Blends", J. Applied Ploym. Sci. 80, 769-775 (2001).

PCT International Search Report for International Application PCT/US2006/035821.

* cited by examiner

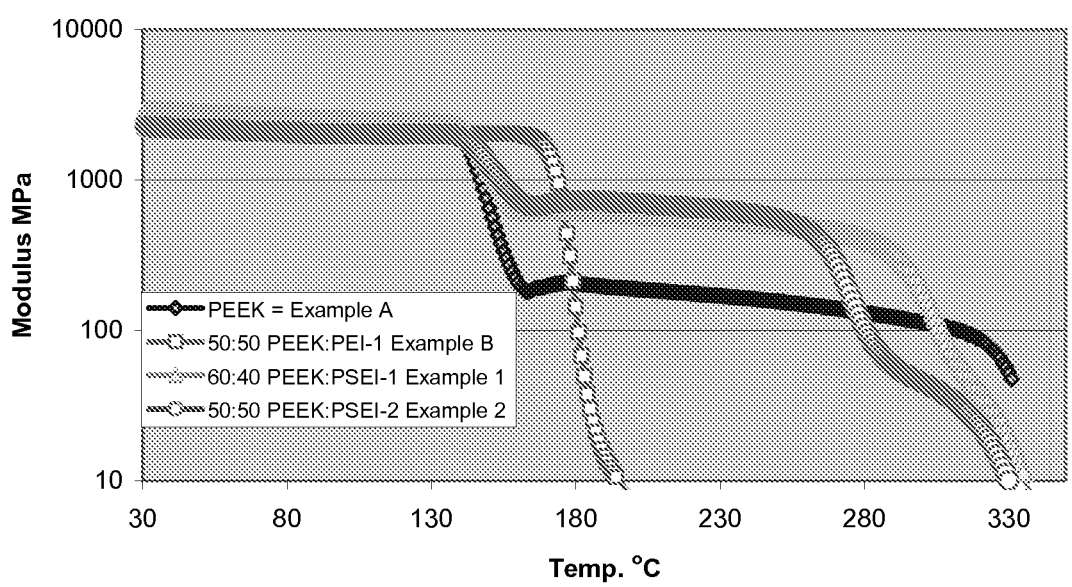

POLY ARYL ETHER KETONE POLYMER BLENDS

RELATED APPLICATIONS

This application is continuation-in-part application of U.S. patent application Ser. No. 11/456,449, filed Jul. 10, 2006, which is a continuation-in-part application of U.S. patent application Ser. No. 11/229,455, filed Sep. 16, 2005, both of which are hereby incorporated by reference in their entirety as though set forth in full.

FIELD OF THE INVENTION

The present invention is directed to filled binary, ternary and quaternary polymer blends including at least one or more poly aryl ether ketones together with at least one or more poly sulfone etherimide and at least one filler.

BACKGROUND OF THE INVENTION

Crystalline poly aryl ketones resins are known in the art as polyaryl ether ketone (PAEK) resins. PAEK resins, for example polyaryl ketones, polyether ketones and polyether ether ketones, have very desirable properties, such as solvent resistance, flame resistance, low wear rate, abrasion resistance, and high strength.

However the relatively low glass transition temperatures (Tg) of these crystalline resins limits their use at high temperatures under load. This deficiency has been improved, but not solved, by the addition of fiberglass, carbon fibers and other reinforcements as well as mineral fillers. Unfortunately, these changes, while improving one property, adversely affect other properties. For example addition of fibers, increases weight, reduces flow and induces anisotropy in molded parts. Such anisotropy in a part may, for example, result in warp or other undesirable dimensional changes, such as curling in a film. In some instances the fiber additives can interfere with the surface smoothness of the shaped parts, causing uneven surface properties. This is especially true in thin parts and films. Addition of a reinforcing filler to PAEK resins will also make it difficult to extrude thin films and fibers.

Thus there exists a need for crystalline poly aryl ether ketone formulations with a range of improved properties, for instance load-bearing capabilities at high temperature, while still having good melt processability allowing for their improved use in molded articles, sheets, films and fibers.

BRIEF DESCRIPTION OF THE FIGURE

FIG. 1 shows the flexural modulus, measured in MegaPascals (MPa), as a function of temperature for an unblended PEEK resin (example A), a miscible polyetherether ketone (PEEK)-polyetherimide (PEI) blend (example B) and two blends combining PEEK with polysulfone etherimide (PSEI) resins (examples 1 & 2). The modulus was measured as per ASTM method D5418 using dynamic mechanical methods on a 3.2 mm molded bar.

BRIEF DESCRIPTION OF THE INVENTION

This invention relates to filled, phase-separated blends of polyaryl ether ketones, polyaryl ketones, polyether ketones, polyether ether ketones and mixtures thereof with at least one polysulfone etherimide, wherein the polysulfone etherimide has greater than or equal to 50 mole % of the polymer linkages containing at least one aryl sulfone group. These filled blends have improved load-bearing capability at high temperature. In another aspect, these filled blends have a higher crystallization temperature, especially at fast cooling rates. In these filled blends the presence of two separate polymeric phases is beneficial to the improvement in properties.

DETAILED DESCRIPTION OF THE INVENTION

The present invention is more particularly described in the following description and examples that are intended to be illustrative only since numerous modifications and variations therein will be apparent to those skilled in the art. As used in the specification and in the claims, the term "comprising" may include the embodiments "consisting of" and "consisting essentially of" All ranges disclosed herein are inclusive of the endpoints and are independently combinable. The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value. In this specification and in the claims that follow, reference will be made to a number of terms that shall be defined to have the following meaning.

The term "hydrogen atom to carbon atom numerical ratio" is the ratio of the number of hydrogen atoms to the number of carbon atoms in the polymer or the repeat unit (monomer) making up the polymer.

The definition of benzylic proton encompasses at least one aliphatic carbon atom chemically bonded directly to at least one aromatic ring, such as a phenyl or benzene ring, wherein said aliphatic carbon atom additionally has at least one proton directly bonded to it.

In the present context substantially or essentially free of benzylic protons means that the polymer, such as for example the polyimide sulfone product, has less than about 5 mole % of structural units, in some embodiments less than about 3 mole % structural units, and in other embodiments less than about 1 mole % structural units derived containing benzylic protons. Free of benzylic protons, which are also known as benzylic hydrogens, means that the polyetherimide article contains zero mole % of structural units derived from monomers and end cappers containing benzylic protons or benzylic hydrogens. The amount of benzylic protons can be determined by ordinary chemical analysis based on the chemical structure. One embodiment of the present invention is directed to the use of a polyetherimide and/or polysulfone etherimide that is essentially free of benzylic protons.

The term "ether" is meant to refer to that class of organic compounds in which an oxygen atom is interposed between two carbon atoms (organic groups) in the molecular structure, giving the generic formula ROR.

"Ketone" refers to a class of organic compounds in which a carbonyl group, C=O, is attached to two substituted, or unsubstituted, alkyl or aryl groups.

The term polyaryl ether ketone, often referred to by the acronym "PAEK", as used herein is meant to include homopolymers, copolymers, terpolymers, graft copolymers, and the like, containing monomer units including one or more aryl groups, one or more ether groups and one or more ketone groups. Blends of one or more PAEK resins may also be used. Different types of PEAK resins include for example, poly ether ketone (PEK), poly ether ether ketone (PEEK), poly ether ketone ether ketone ketone (PEKEKK) and poly ether ketone ketone (PEKK), poly aryl ether ketone ether ketone ketone (PAEKEKK), poly aryl ether ketone (PAEK), poly aryl ether ether ketone (PAEEK), poly ether ether ketone (PEEKK), poly aryl ether ketone ketone (PAEKK), poly aryl ether ether ketone ketone (PAEEKK).

PEEK is commercially available from Victrex Ltd. as VICTREX PEEK. PEKEKK resin is commercially available from BASF Co. as ULTRAPEK.

"Ternary" is descriptive of a polymer blend including three different polymers. As used for this, and the next definition, the term "different" means that the polymer backbone of each polymer in the blend is based upon at least one monomer which is chemically distinct from all monomers in the other two polymers in the blend.

"Quaternary" is descriptive of a polymer blend including four different polymers.

"Polysulfone" is an aromatic polymer also having an $-SO_2$- group, such as for example, polysulfone (PSU), polyether sulfone (PES), polyphenylene sulfone (PPSU) and PSS. Polysulfones are available under trade names such as Udel, Radel, Supradel and Ultrason by Solvay and BASF. Additional polysulfones are described, for example, in ASTM D6394-05 "Standard Specification for Sulfone Plastics".

"Crystalline polymer" refers to a semi-crystalline thermoplastic polymer showing both a glass transition temperature (Tg) and a crystalline melting point (Tm). Particular crystalline polymers according to the present invention include polyphenylene sulfide (PPS, e.g., Fortron & Ryton), high temperature nylon (HTN, e.g., Genestar-9T, Amodel, Zytel), and other polyamides, liquid crystalline polymers (LCP's, e.g., Zenite® from Dupont, Vectra® from TICONA, XYDAR® from SOLVAY) and other crystalline Polyesters as well as semi-crystalline polyimides such as Aurum (Mitsui).

"High Performance Polymer" refers to a polymer other than PAEK, polyetherimde, poly sulfone ether imde, polysulfone and semi-crystalline polymer. High performance polymers offer high strength (>100 MPa) and/or high temperature (>180 C) load bearing performance such that addition of a high performance polymer to other polymers in a blend according to the present invention will improve one of these properties. The present invention includes, but is not limited to, imidized polymers such as polyamide imide (PAI), polybenzimidazole (PBI) and polyimide (PI) as well as polyphenylenes and substituted polyphenylenes as high performance polymers within this definition.

In another embodiment of the present invention a polyetherimide having a hydrogen atom to carbon atom ratio of between about 0.4 and about 0.85 can be blended with one or more additional polymer components. The hydrogen atom number to carbon atom number may also be from about 0.50 to about 0.80 or from about 0.55 to about 0.75, or from about 0.60 to about 0.70.

The present invention is directed to a filled, phase-separated polymer blend including a mixture of a resin blend with a filler, wherein the resin blend includes: a) a first resin component selected from one or more of the group including: polyaryl ether ketones, polyaryl ketones, polyether ketones and polyether ether ketones; with, b) a second resin component including at least one polysulfone etherimide having greater than or equal to 50 mole % of the linkages containing at least one aryl sulfone group.

In the context of this invention phase separated means that the PAEK and the PSEI resins exist in admixture as separate chemical entities that can be distinguished, using standard analytical techniques, for example such as microscopy, differential scanning calorimetry or dynamic mechanical analysis, to show a least two distinct polymeric phases one of which includes PAEK resin and one of which includes PSEI resin. In some instances the phases will contain greater than about 80 wt % of said resin. In other instances the blends will form separate distinct domains from about 0.1 to 50 microns in size, in others cases the domains will range in size from about 0.1 to 20 microns. The PAEK-PSEI blends may be completely immiscible or may show partial miscibility but must behave such that, at least in the solid state, the blend shows two or mores distinct polymeric phases.

The ratio of first component resin to second component resin in the resin blend can be any that results in a resin blend that has improved properties i.e. better or worse depending on the end use application, than either component alone. The ratio, in parts by weight, may range anywhere from 1:99 to 99:1, depending on the end use application, and the desired property to be improved. The range of ratios can also be from 15:85 to 85:15 or even anywhere from 25:75 to 75:25. Depending on the application, the ratio may also be from 40:60 to 60:40. The skilled artisan will appreciate that changing the ratios of the first resin component to the second resin component can fall to any real number ratio within the recited ranges depending on the selected result. Thus, the ratio of a first component resin (e.g., a polyaryl ether ketone) to the second component resin (e.g., polysulfone etherimide) can be 51:49 to 99:1 or greater than 50:50 to 85:15.

The properties of the final resin blend, which can be adjusted by changing the ratios of ingredients, include heat distortion temperature and load bearing capability. For example, in one embodiment the polyetherimide sulfone resin can be present in any amount effective to change, i.e. improve by increasing, the load bearing capability of the PAEK blends over the individual components themselves. In some instances the polyaryl ether ketone resin can be present from 30 to 70 wt % of the entire mixture while the polysulfone etherimide varies from 70 to 30 wt %.

In some embodiments of the invention the composition will have a heat distortion temperature (HDT) measured using ASTM method D5418, on a 3.2 mm bar at 0.46 Mpa (66 psi) of greater than about 170° C. In other instances the HDT at 0.46 MPA (66 psi) will be over 200° C. In still other instances, load-bearing capability of the PAEK-polysulfone etherimides will be shown in a Vicat temperature, as measured by ASTM method D1525 at 50 newtons (N) of greater than about 200° C.

In still other instances load bearing capability of the PAEK-polysulfone etherimide compositions will be shown by a flexural modulus of greater than or equal to about 200 MPa as measured on a 3.2 mm bar, for example as measured by ASTM method D5418, at 200° C.

Filled polymer blends according to the present invention may be made by mixing in the molten state, an amount of: a) a first resin component selected from one or more of the group including polyaryl ether ketones, polyaryl ketones, polyether ketones and polyether ether ketones; with, b) a second resin component including at least one polysulfone etherimide having greater than or equal to 50 mole % of the linkages containing at least one aryl sulfone group; and c) at least one filler. The three components may be mixed by any method known to the skilled artisan that will result in a filled blend according to the present invention. Such methods include extrusion, sintering and the like.

As used in the present invention the term Polyaryl ether ketones (PAEK) includes several polymer types containing aromatic rings, usually phenyl rings, linked primarily by ketone and ether groups in different sequences. Examples of PAEK resins are; polyether ketones (PEK), polyether ether ketones (PEEK), polyether ketone ether ketone ketones (PEKEKK) and polyether ketone ketones (PEKK) and copolymers containing such groups as well as blends thereof. The PAEK polymers may include monomer units containing an aromatic ring, usually a phenyl ring, a keto group and an ether group in any sequence. Low levels, for example less than 10 mole %, of addition linking groups may be present as long as they do not fundamentally alter the properties if the PAEK resin The first resin component in the resin blend is a polymer selected from the group including polyaryl ether ketones, polyaryl ketones, polyether ketones and polyether ether ketones. Any of the PAEK polymers may be used that will have improved properties through blending with a second resin component according to the present invention. This encompasses the use of one or more polymers from any of the several classes of PAEKs described herein or described in the references cited herein.

For example, several polyaryl ether ketones that are highly crystalline, with melting points above 300° C., may be used in blends according to the present invention. Examples of these crystalline polyaryl ether ketones are shown in the structures 1, 2, 3, 4 & 5 below:

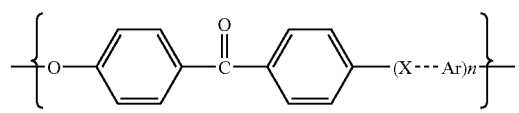
(6)

wherein Ar is independently a divalent aromatic radical selected from phenylene, biphenylene or naphthylene, X is independently —O—, —C(O)—, —O—Ar—C(O)—, —S—, —SO$_2$— or a direct bond and n is an integer of from 0 to about 10.

Polyaryl ketones can be prepared by methods well known in the art. One such method includes heating a substantially equimolar mixture of at least one bisphenol, often reacted as its bis-phenolate salt, and at least one of either a dihalobenzoid compound or, in other cases, at least one halophenol compound may be reacted to form polymer. In other instances mixtures of these compounds may be used. For example hydroquinone can be reacted with a dihalo aryl ketone, such a dichloro benzophenone of difluoro benzophenone to form a poly aryl ether ketone. In other cases dihydroxy aryl ketone, such as dihydroxy benzophenone can be polymerized with aryl dihalides such as dichloro benzene to form PAEK resins. In still other instances dihydroxy aryl ethers, such as dihydroxy diphenyl ether can be reacted with dihalo aryl ketones, such a difluoro benzophenone. In other variations dihydroxy

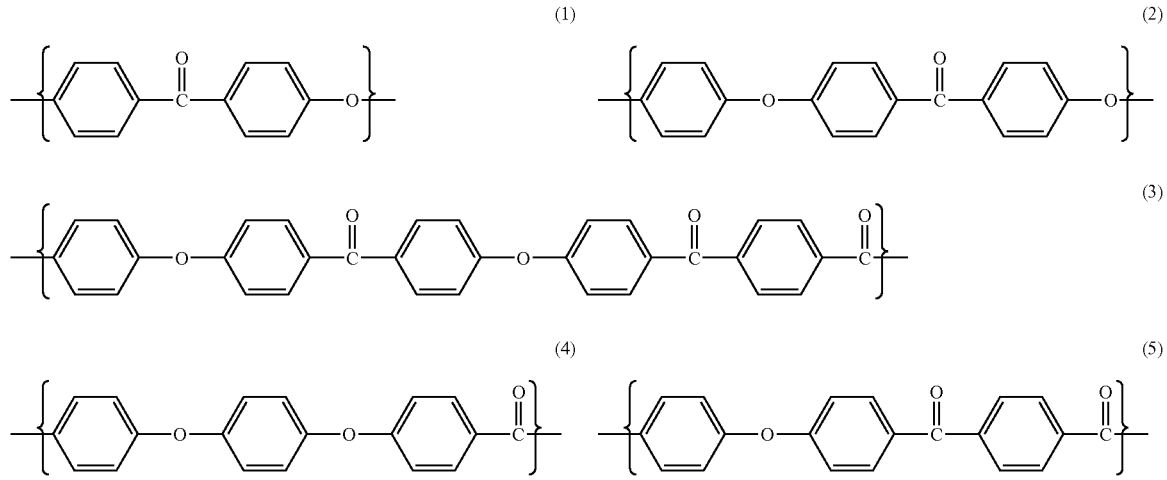

The skilled artisan will know that there is a well-developed and substantial body of patent and other literature directed to formation and properties of polyaryl ether ketones. For example, some of the early work, such as U.S. Pat. No. 3,065,205, involves the electrophilic aromatic substitution (e.g., Friedel-Crafts catalyzed) reaction of aromatic diacyl halides with unsubstituted aromatic compounds such as diphenyl ether. The evolution of this class was achieved in U.S. Pat. No. 4,175,175 which shows that a broad range of resins can be formed, for example, by the nucleophilic aromatic substitution reaction of an activated aromatic dihalide and an aromatic diol or salt thereof.

Other examples of crystalline polyaryl ether ketones that are suitable for use herein can be generically characterized as containing repeating units of the following formula (6):

compounds with no ether linkages, such as or dihydroxy biphenyl or hydroquinone may be reacted with dihalo compounds which may have both ether and ketone linkages, for instance bis-(dichloro phenyl) benzophenone. In other instances diaryl ether carboxylic acids, or carboxylic acid halides can be polymerized to form poly aryl ether ketones. Examples of such compounds are diphenylether carboxylic acid, diphenyl ether carboxylic acid chloride, phenoxy-phenoxy benzoic acid, or mixtures thereof. In still other instances dicarboxylic acids or dicarboxylic acid halides can be condensed with diaryl ethers, for instance iso or tere phthaloyl chlorides (or mixtures thereof) can be reacted with diphenyl ether, to form PAEK resins.

The process as described in, for example, U.S. Pat. No. 4,176,222 may produce polyaryl ether ketones. This process includes heating in the temperature range of 100 to 400° C., (i) a substantially equimolar mixture of: (a) at least one bisphenol; and, (b.i) at least one dihalobenzenoid compound, and/or (b.ii) at least one halophenol, in which in the dihalobenzenoid compound or halophenol, the halogen atoms are activated by —C=O— groups ortho or para thereto, with a mixture of sodium carbonate or bicarbonate and a second alkali metal carbonate or bicarbonate, the alkali metal of said second alkali metal carbonate or bicarbonate having a higher atomic number than that of sodium, the amount of said second alkali metal carbonate or bicarbonate being such that there are 0.001 to 0.2 gram atoms of said alkali metal of higher atomic number per gram atom of sodium, the total amount of alkali metal carbonate or bicarbonate being such that there is at least one alkali metal atom for each phenol group present, and thereafter separating the polymer from the alkali metal halide.

Yet other poly aryl ether ketones may also be prepared according to the process as described in, for example, U.S. Pat. No. 4,396,755. In such processes, reactants such as: (a) a dicarboxylic acid; (b) at least one divalent aromatic radical and at least one mono aromatic dicarboxylic acid and, (c) combinations of (a) and (b), are reacted in the presence of a fluoroalkane sulfonic acid, particularly trifluoromethane sulfonic acid.

Additional polyaryl ether ketones may be prepared according to the process as described in, for example, U.S. Pat. No. 4,398,020 wherein aromatic diacyl compounds are polymerized with at least one aromatic compound and at least one mono acyl halide.

The polyaryl ether ketones may have a reduced viscosity of at least about 0.4 to about 5.0 dl/g, as measured in concentrated sulfuric acid at 25° C. PAEK weight average molecular weight (Mw) may vary from 5,000 to 150,000 g/mole. In other instances Mw may be from about 10,000-80,000 g/mole.

The term polyaryl ether ketone as used herein is meant to include homopolymers, copolymers, terpolymers, graft copolymers, and the like. Blends of one or more PAEK resins may also be used. Different types of PEAK resins include for example, poly ether ketone (PEK), poly ether ether ketone (PEEK), poly ether ketone ether ketone ketone (PEKEKK) and poly ether ketone ketone (PEKK). PEEK is commercially available from Victrex Ltd. as VICTREX PEEK. PEKEKK resin is commercially available from BASF Co. as ULTRAPEK.

The second resin component in the resin blend is a polysulfone etherimide (PSEI) resin. As used herein the PSEI includes structural units having the general formula (7) wherein at least 50 mole % of the polymer linkages have at least one aryl sulfone group and

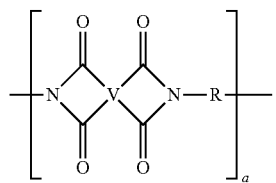

(7)

wherein a is more than 1, typically about 10 to about 1000 or more, and more preferably about 10 to about 500; and V is a tetravalent linker without limitation, as long as the linker does not impede synthesis or use of the polysulfone etherimide. Suitable linkers include but are not limited to: (a) substituted or unsubstituted, saturated, unsaturated or aromatic monocyclic or polycyclic groups having about 5 to about 50 carbon atoms; (b) substituted or unsubstituted, linear or branched, saturated or unsaturated alkyl groups having 1 to about 30 carbon atoms; or (c) combinations thereof. Preferred linkers include but are not limited to tetravalent aromatic radicals of formula (8), such as,

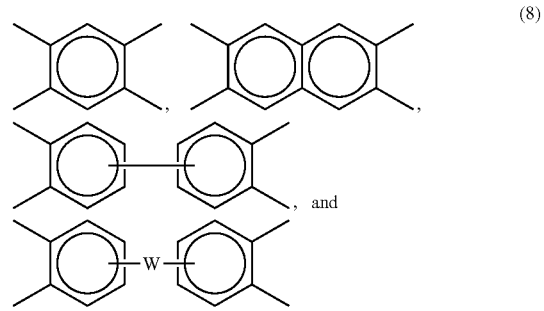

(8)

wherein W is in some embodiments a divalent moiety selected from the group consisting of —SO$_2$—, —O—, —S—, —C(O)—, C$_y$H$_{2y}$— (y being an integer from 1 to 5), and halogenated derivatives thereof, including perfluoroalkylene groups, or a group of the formula —O-D-O—. The group D may include the residue of bisphenol compounds. For example, D may be any of the molecules shown in formula (9):

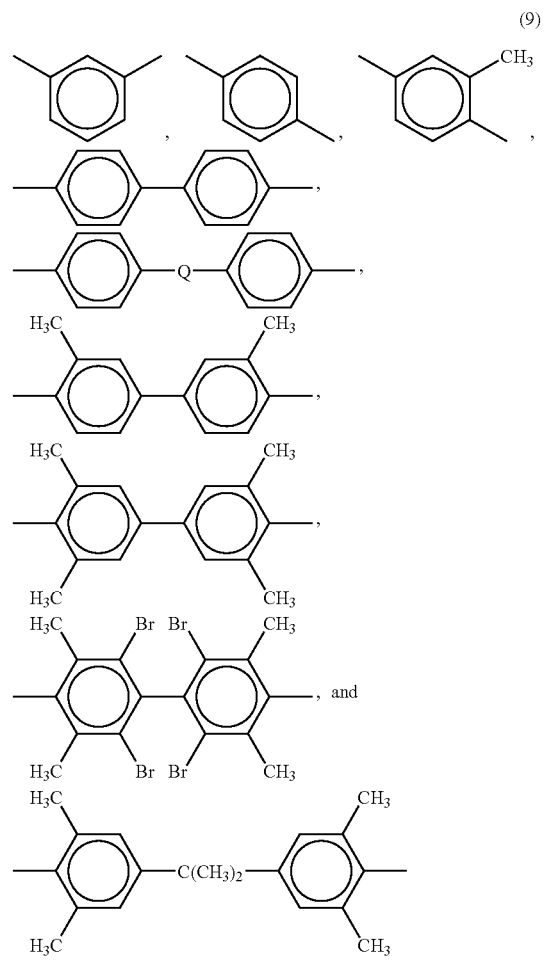

(9)

The divalent bonds of the —W— or the —O-D-O— group may be in the 3,3', 3,4', 4,3', or the 4,4' positions. Mixtures of the aforesaid compounds may also be used. Groups free of benzylic protons are often preferred for superior melt stability. Groups where W is —SO$_2$— are of specific note as they are one method of introducing aryl sulfone linkages into the polysulfone etherimide resins.

In the context of this invention the term "polymer linkage" or "a polymer linkage" is defined as the reaction product of at least two monomers which form the polymer, wherein at least one of the monomers is a dianhydride, or chemical equivalent, and wherein the second monomer is at least one diamine, or chemical equivalent. The polymer is included on 100 mole % of such linkages. A polymer that has 50 mole % aryl sulfone linkages, for example, will have half of its linkages (on a molar basis) including dianhydride or diamine-derived linkages with at least one aryl sulfone group.

Alternatively, the same polymer backbone may be put together using a different process using monomers other than a dianhydride and a diamine e.g., the process described for example in: U.S. Pat. Nos. 5,068,353; 5,229,482; 5,514,813; 5,830,974; 5,851,837; 5,856,421; 5,908,915; 6,020,456.

Suitable dihydroxy-substituted aromatic hydrocarbons used as precursors to the —O-D-O— group also include those of the formula (10):

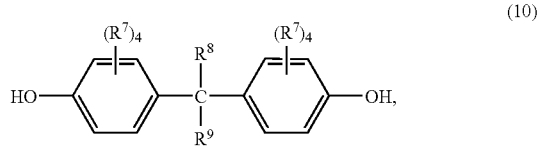

where each R$^7$ is independently hydrogen, chlorine, bromine, alkoxy, aryloxy or a C$_{1-30}$ monovalent hydrocarbon or hydrocarbonoxy group, and R$^8$ and R$^9$ are independently hydrogen, aryl, alkyl fluoro groups or C$_{1-30}$ hydrocarbon groups.

Dihydroxy-substituted aromatic hydrocarbons that may be used as precursors to the —O-D-O— group include those disclosed by name or formula in U.S. Pat. Nos. 2,991,273; 2,999,835; 3,028,365; 3,148,172; 3,153,008; 3,271,367; 3,271,368; and 4,217,438. Specific examples of dihydroxy-substituted aromatic hydrocarbons that may be used in the present invention include, but are not limited to, bis(4-hydroxyphenyl)sulfone, bis(4-hydroxyphenyl)sulfide, bis(4-hydroxyphenyl) ether, bis(4-hydroxyphenyl)sulfoxide, 1,4-dihydroxybenzene, 4,4'-oxydiphenol, 2,2-bis(4-hydroxyphenyl)hexafluoropropane, 4,4'-(3,3,5-trimethylcyclohexylidene)diphenol; 4,4'-bis(3,5-dimethyl) diphenol, 1,1-bis(4-hydroxy-3-methylphenyl)cyclohexane; 4,4-bis(4-hydroxyphenyl)heptane; 2,4'-dihydroxydiphenylmethane; bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,2-bis(4-hydroxyphenyl)ethane; 1,1-bis(4-hydroxy-2-chlorophenyl)ethane; 2,2-bis(3-phenyl-4-hydroxyphenyl)propane; 2,2-bis(4-hydroxy-3-methylphenyl)propane; 2,2-bis(4-hydroxy-3-ethylphenyl)propane; 2,2-bis(4-hydroxy-3-isopropylphenyl)propane; 2,2-bis(4-hydroxy-3,5-dimethylphenyl)propane; 3,5,3',5'-tetrachloro-4,4'-dihydroxyphenyl)propane; bis(4-hydroxyphenyl) cyclohexylmethane; 2,2-bis(4-hydroxyphenyl)-1-phenylpropane; 2,4'-dihydroxyphenyl sulfone; dihydroxy naphthalene; 2,6-dihydroxy naphthalene; hydroquinone; resorcinol; C$_{1-3}$ alkyl-substituted resorcinols; methyl resorcinol, 1,4-dihydroxy-3-methylbenzene; 2,2-bis(4-hydroxyphenyl)butane; 2,2-bis(4-hydroxyphenyl)-2-methylbutane; 1,1-bis(4-hydroxyphenyl)cyclohexane; 4,4'-dihydroxydiphenyl; 2-(3-methyl-4-hydroxyphenyl-2-(4-hydroxyphenyl)propane; 2-(3,5-dimethyl-4-hydroxyphenyl)-2-(4-hydroxyphenyl)propane; 2-(3-methyl-4-hydroxyphenyl)-2-(3,5-dimethyl-4-hydroxyphenyl)propane; bis(3,5-dimethylphenyl-4-hydroxyphenyl)methane; 1,1-bis(3,5-dimethylphenyl-4-hydroxyphenyl)ethane; 2,2-bis(3,5-dimethylphenyl-4-hydroxyphenyl)propane; 2,4-bis(3,5-dimethylphenyl-4-hydroxyphenyl)-2-methylbutane; 3,3-bis (3,5-dimethylphenyl-4-hydroxyphenyl)pentane; 1,1-bis(3,5-dimethylphenyl-4-hydroxyphenyl)cyclopentane; 1,1-bis(3,5-dimethylphenyl-4-hydroxyphenyl)cyclohexane; bis(3,5-dimethyl-4-hydroxyphenyl) sulfoxide, bis(3,5-dimethyl-4-hydroxyphenyl) sulfone and bis(3,5-dimethylphenyl-4-hydroxyphenyl)sulfide. Mixtures including any of the foregoing dihydroxy-substituted aromatic hydrocarbons may also be employed.

In a particular embodiment the dihydroxy-substituted aromatic hydrocarbon including bisphenols with sulfone linkages are of note as this is another route to introducing aryl sulfone linkages into the polysulfone etherimide resin. In other embodiments bisphenol compounds free of benzylic protons may be used to make polysulfone etherimides with superior melt stability.

In Formula (8) the R group is the residue of a diamino compound, or chemical equivalent, that includes but is not limited to, substituted or unsubstituted divalent organic radicals such as: (a) aromatic hydrocarbon radicals having about 6 to about 24 carbon atoms and halogenated derivatives thereof, (b) straight or branched chain alkylene radicals having about 2 to about 20 carbon atoms; (c) cycloalkylene radicals having about 3 to about 24 carbon atoms, or (d) divalent radicals of the general formula (11):

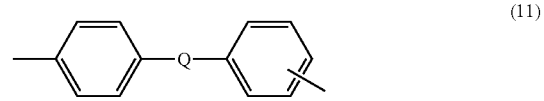

wherein Q includes but is not limited to a divalent moiety selected from the group consisting of —SO$_2$—, —O—, —S—, —C(O)—, C$_y$H$_{2y}$— (y being an integer from 1 to 5), and halogenated derivatives thereof, including perfluoroalkylene groups. In particular embodiments R is essentially free of benzylic hydrogens. The presence of benzylic protons can be deduced from the chemical structure.

In some particular embodiments suitable aromatic diamines include: ethylenediamine; propylenediamine; trimethylenediamine; diethylenetriamine; triethylenetetramine; hexamethylenediamine; heptamethylenediamine; octamethylenediamine; nonamethylenediamine; decamethylenediamine; 1,12-dodecanediamine; 1,18-octadecanediamine; 3-methylheptamethylenediamine; 4,4-dimethylheptamethylenediamine; 4-methylnonamethylenediamine; 5-methylnonamethylenediamine; 2,5-dimethylhexamethylenediamine; 2,5-dimethylheptamethylenediamine; 2,2-dimethylpropylenediamine; N-methyl-bis (3-aminopropyl)amine; 3-methoxyhexamethylenediamine; 1,2-bis(3-aminopropoxy) ethane; bis(3-aminopropyl) sulfide; 1,4-cyclohexanediamine; bis-(4-aminocyclohexyl) methane; m-phenylenediamine (mPD); p-phenylenediamine (pPD); 2,4-diaminotoluene; 2,6-diaminotoluene; m-xylylenediamine; p-xylylenediamine; 2-methyl-4,6-diethyl-1,3-phenylene-diamine; 5-methyl-4,6-diethyl-1,3-phenylene-diamine; benzidine; 3,3'-dimethylbenzidine; 3,3'-dimethoxybenzidine; 1,5-diaminonaphthalene; bis(4-aminophenyl) methane; bis(2-chloro-4-amino-3,5-diethylphenyl) methane; bis(4-aminophenyl) propane; 2,4-bis(b-amino-t-butyl) toluene; bis (p-b-amino-t-butylphenyl) ether; bis(p-b-methyl-o-aminophenyl)benzene, bis(p-b-methyl-o-aminopentyl) benzene, 1,3-diamino-4-isopropylbenzene, bis(4-aminophenyl) sulfide, bis (4-aminophenyl) sulfone, bis(4-aminophenyl) ether, and, 1,3-bis(3-aminopropyl) tetramethyldisiloxane; 4,4'-diaminodiphenylpropane; 4,4'-diaminodiphenylmethane (4,4'-methylenedianiline); 4,4'-diaminodiphenyl sulfide; 4,4'-diaminodiphenyl sulfone; 4,4'-diaminodiphenyl ether (4,4'-oxydianiline); 1,5-diaminonaphthalene; 3,3'dimethylbenzidine; 3-methylhaptamethylenediamine; 4,4-dimethylhaptamethylenediamine; 2,11-dodecanediamine; octamethylenediamine; bis(3-aminopropyl)tetramethyldisiloxane; bis(4-aminobutyl)tetramethyldisiloxane; bis(p-amino-t-butylphenyl)ether; bis(p-methyl-o-aminophenyl)benzene; bis(p-methyl-o-aminopentyl)benzene; 2,2',3,3'-tetrahydro-3,3,3',3'-tetramethyl-1,1'-spirobi[1H-indene]-6,6'-diamine; 3,3',4,4'-tetrahydro-4,4,4',4'-tetramethyl-2,2'-spirobi[2H-1-benzopyran]-7,7'-diamine; and, 1,1'-bis[1-amino-2-methyl-4-phenyl]cyclohexane; toluene-diamine; 1,3-bis(4-aminophenoxy) benzene (1,3 4 APB); 1,3-bis(3-aminophenoxy)benzene (1, 3, 3 APB); and all isomers thereof as well as mixtures and blends including at least one of the foregoing.

In beneficial embodiments, the diamino compounds are aromatic diamines, especially m- and p-phenylenediamine and mixtures including at least one of the foregoing.

Thermoplastic polysulfone etherimides described herein may be derived from reactants including one or more aromatic diamines or their chemically equivalent derivatives and one or more aromatic tetracarboxylic acid cyclic dianhydrides (sometimes referred to hereinafter as aromatic dianhydrides), aromatic tetracarboxylic acids, or their derivatives capable of forming cyclic anhydrides. In addition, at least a portion of one or the other of, or at least a portion of each of, the reactants including aromatic diamines and aromatic dianhydrides includes an aryl sulfone linkage such that at least 50 mole % of the resultant polymer linkages contain at least one aryl sulfone group. In a particular embodiment all of one or the other of, or, each of, the reactants including aromatic diamines and aromatic dianhydrides having at least one sulfone linkage. The reactants polymerize to form polymers including cyclic imide linkages and sulfone linkages.

Illustrative examples of aromatic dianhydrides include:
2,2-bis[4-(3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
4,4'-bis(3,4-dicarboxyphenoxy)benzophenone dianhydride;
4,4'-bis(3,4-dicarboxyphenoxy)diphenyl sulfone dianhydride;
2,2-bis[4-(2,3-dicarboxyphenoxy)phenyl]propane dianhydride;
4,4'-bis(2,3-dicarboxyphenoxy)diphenyl ether dianhydride;
4,4'-bis(2,3-dicarboxyphenoxy)diphenyl sulfide dianhydride;
4,4'-bis(2,3-dicarboxyphenoxy)benzophenone dianhydride;
4,4'-bis(2,3-dicarboxyphenoxy)diphenyl sulfone dianhydride;
4-(2,3-dicarboxyphenoxy)-4'-(3,4-dicarboxyphenoxy) diphenyl-2,2-propane dianhydride;
4-(2,3-dicarboxyphenoxy)-4'-(3,4-dicarboxyphenoxy) diphenyl ether dianhydride;
4-(2,3-dicarboxyphenoxy)-4'-(3,4-dicarboxyphenoxy) diphenyl sulfide dianhydride;
4-(2,3-dicarboxyphenoxy)-4'-(3,4-dicarboxyphenoxy)benzophenone dianhydride;
4-(2,3-dicarboxyphenoxy)-4'-(3,4-dicarboxyphenoxy) diphenyl sulfone dianhydride;
1,3-bis(2,3-dicarboxyphenoxy)benzene dianhydride;
1,4-bis(2,3-dicarboxyphenoxy)benzene dianhydride;
1,3-bis(3,4-dicarboxyphenoxy)benzene dianhydride;
1,4-bis(3,4-dicarboxyphenoxy)benzene dianhydride;
cyclobutane tetracarboxylic dianhydride;
cyclopentane tetracarboxylic dianhydride;
cyclohexane-1,2,5,6-tetracarboxylic dianhydride;
2,3,5-tricarboxycyclopentylacetic dianhydride;
5-(2,5-dioxotetrahydrofural)-3-methyl-3-cyclohexene-1,2-dicarboxylic dianhydride;
1,3,3a,5-dioxo-3-furanyl)-naphtho[1,2,-c]-furan-1,3-dione;
3,5,6-tricarboxynorbornane-2-acetic dianhydride;
2,3,4,5-tetrahydrofuran tetracarboxylic dianhydride;
3,3',4,4'-diphenyl tetracarboxylic dianhydride;
3,3',4,4'-benzophenonetetracarboxylic dianhydride;
naphthalic dianhydrides such as (2,3,6,7-naphthalic dianhydride etc.);
3,3',4,4'-biphenylsulphonictetracarboxylic dianhydride;
3,3', 4,4'-biphenylethertetracarboxylic dianhydride;
3,3',4,4'-dimethyldiphenylsilane tetracarboxylic dianhydride;
4,4'-bis (3,4-dicarboxyphenoxy)diphenylsulfide dianhydride;
4,4'-bis (3,4-dicarboxyphenoxy)diphenylsulphone dianhydride;
4,4'-bis (3,4-dicarboxyphenoxy)diphenylpropane dianhydride;
3,3',4,4'-perfluoropyridenediphthalic dianhydride;
3,3',4,4'-biphenyltetracarboxylic dianhydride;
bis(phthalic)phenylsulphineoxide dianhydride;
p-phenylene-bis(triphenylphthalic)dianhydride;
m-phenylene-bis (triphenylphthalic)dianhydride;
bis(triphenylphthalic)-4,4'-diphenylether dianhydride;
bis(triphenylphthalic)-4,4'-diphenylmethane dianhydride;
2,2'-Bis-(3,4-Dicarboxyphenyl)hexafluoro-propane dianhydride;
4,4'-oxydiphthalic anhydride;
4,3'-oxydiphthalic anhydride;
3,3'-oxydiphthalic anhydride;
pyromellitic dianhydride;
3,3',4,4'-Diphenylsulfone tetracarboxylic dianhydride;
4,4'-Bisphenol A Dianhydride;
3,4'-Bisphenol A Dianhydride;
3,3'-Bisphenol A Dianhydride;
Hydroquinnone diphthalic anhydride;
Ethylene glycol bis trimellitic anhydride;
6,6'-bis(3,4-dicarboxyphenoxy)-2,2',3,3'-tetrahydro-3,3,3',3'-tetramethyl-1,1'-spirobi[1H-indene]dianhydride;
7,7'-bis(3,4-dicarboxyphenoxy)-3,3',4,4'-tetrahydro-4,4,4',4'-tetramethyl-2,2'-spirobi[2H-1-benzopyran]dianhydride;
1,1'-bis[1-(3,4-dicarboxyphenoxy)-2-methyl-4-phenyl]cyclohexane dianhydride;
3,3',4,4'-Diphenylsulfone tetracarboxylic dianhydride;
3.3',4,4'-Diphenylsulfide tetracarboxylic dianhydride;
3.3',4,4'-Diphenylsulfoxide tetracarboxylic dianhydride;
3,3'-benzophenone tetracarboxylic dianhydride;
4,4'-Carbonyldiphthalic anhydride;
3.3',4,4'-Diphenylmethane tetracarboxylic dianhydride;
2,2-bis(4-(3,3-dicarboxyphenyl)propane dianhydride;

2,2-bis(4-(3,3-dicarboxyphenyl)hexafluoropropane dianhydride;
(3,3',4,4'-diphenyl)phenylphosphine tetracarboxylic dianhydride;
(3,3',4,4'-diphenyl)phenylphosphineoxide tetracarboxylic dianhydride;
2,2'-dichloro-3,3',4,4'-biphenyltetracarboxylic dianhydride;
2,2'-dimethyl-3,3',4,4'-biphenyltetracarboxylic dianhydride;
2,2'-dicyano-3,3',4,4'-biphenyltetracarboxylic dianhydride;
2,2'-dibromo-3,3',4,4'-biphenyltetracarboxylic dianhydride;
2,2'-diiodo-3,3',4,4'-biphenyltetracarboxylic dianhydride;
2,2'-ditrifluoromethyl-3,3',4,4'-biphenyltetracarboxylic dianhydride;
2,2'-bis(1-methyl-4-phenyl)-3,3',4,4'-biphenyltetracarboxylic dianhydride;
2,2'-bis(1-trifluoromethyl-2-phenyl)-3,3',4,4'-biphenyltetracarboxylic dianhydride;
2,2'-bis(1-trifluoromethyl-3-phenyl)-3,3',4,4'-biphenyltetracarboxylic dianhydride;
2,2'-bis(1-trifluoromethyl-4-phenyl)-3,3',4,4'-biphenyltetracarboxylic dianhydride;
2,2'-bis(1-phenyl-4-phenyl)-3,3',4,4'-biphenyltetracarboxylic dianhydride;
2,2'-bis(1,3-trifluoromethyl-4-phenyl)-3,3',4,4'-biphenyltetracarboxylic dianhydride; and,
5,5'-[[1,1'-biphenyl]-4,4'-diylbis(oxy)]bis[1,3-isobenzofurandione] (also called 4,4'-bis(3,4-dicarboxyphenoxy)biphenyl dianhydride) and isomers and chemical equivalents (ie., tetra acid is equivalent to dianhydride, etc.) thereof, as well as mixtures and blends including at least one of the foregoing.

It is understood that there are a variety of chemically equivalent compounds, and or tautomers, that will produce an identical polymer as the dianhydrides set forth above. For example, the tetracarboxylic acid equivalent of any of these dianhydrides will produce the same polymer. The present invention is specifically intended to include all such chemical equivalents of the monomers mentioned herein.

Polysulfone etherimides with structural units derived from mixtures including two or more dianhydrides are also within the scope of the invention.

In other embodiments, the polysulfone etherimides have at least 50 mole % imide linkages derived from an aromatic ether anhydride that is an oxydiphthalic anhydride, in an alternative embodiment, from 60 mole % to 100 mole % oxydiphthalic anhydride derived imide linkages. In an alternative embodiment, from 70 mole % to 99 mole % of the imide linkages are derived from oxydiphthalic anhydride or chemical equivalent.

The term "oxydiphthalic anhydride" means, for purposes of the embodiments of the present invention, the oxydiphthalic anhydride of the formula (12):

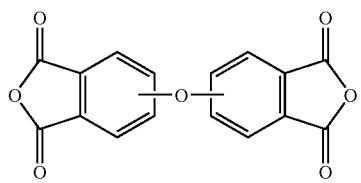

(12)

and derivatives thereof as further defined below.

The oxydiphthalic anhydrides of formula (12) includes 4,4'-oxybisphthalic anhydride, 3,4'-oxybisphthalic anhydride, 3,3'-oxybisphthalic anhydride, and any mixtures thereof. For example, the polysulfone etherimide containing at least 50 mole % imide linkages derived from oxydiphthalic anhydride may be derived from 4,4'-oxybisphthalic anhydride structural units of formula (13):

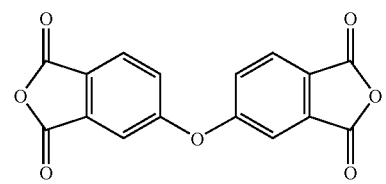

(13)

As mentioned above, derivatives of oxydiphthalic anhydrides may be employed to make polysulfone etherimides. Examples of a derivatized anhydride group which can function as a chemical equivalent for the oxydiphthalic anhydride in imide forming reactions, includes oxydiphthalic anhydride derivatives of the formula (14):

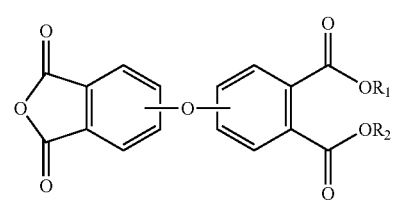

(14)

wherein $R_1$ and $R_2$ of formula 14 can be any of the following: hydrogen; an alkyl group; an aryl group. $R_1$ and $R_2$ can be the same or different to produce an oxydiphthalic anhydride acid, an oxydiphthalic anhydride ester, and an oxydiphthalic anhydride acid ester.

The polysulfone etherimides herein may include imide linkages derived from oxydiphthalic anhydride derivatives which have two derivatized anhydride groups, such as for example, where the oxy diphthalic anhydride derivative is of the formula (15):

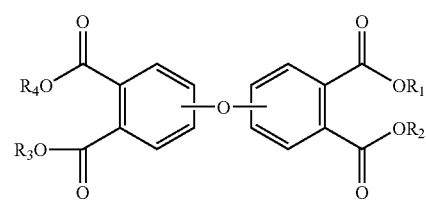

(15)

wherein $R_1$, $R_2$, $R_3$ and $R_4$ of formula (15) can be any of the following: hydrogen; an alkyl group, an aryl group. $R_1$, $R_2$, $R_3$, and $R_4$ can be the same or different to produce an oxydiphthalic acid, an oxydiphthalic ester, and an oxydiphthalic acid ester.

Copolymers or blends of polysulfone etherimides that include structural units derived from imidization reactions of mixtures of the oxydiphthalic anhydrides listed above having two, three, or more different dianhydrides, and a more or less equal molar amount of an organic diamine with a flexible linkage, are also within the scope of the invention. In addition, copolymers having at least about 50 mole % imide linkages derived from oxy diphthalic anhydrides defined above, which includes derivatives thereof, and up to about 50 mole % of alternative dianhydrides distinct from oxydiphthalic anhydride are also contemplated. That is, in some embodiments, it will be beneficial to make copolymers that, in addition to having at least about 50 mole % linkages derived from oxydiphthalic anhydride, will also include imide linkages derived from aromatic dianhydrides different than oxydiphthalic anhydrides such as, for example, bisphenol A dianhydride (BPADA), disulfone dianhydride, benzophenone dianhydride, bis (carbophenoxy phenyl) hexafluoro propane dianhydride, bisphenol dianhydride, pyromellitic dianhydride (PMDA), biphenyl dianhydride, sulfur dianhydride, sulfo dianhydride and mixtures thereof.

In another embodiment of the present invention, the dianhydride, as defined above, reacts with an aryl diamine that has a sulfone linkage. In one embodiment the polysulfone etherimide includes structural units that are derived from an aryl diamino sulfone of the formula (16):

$$H_2N-Ar-SO_2-Ar-NH_2 \tag{16}$$

wherein Ar can be an aryl group species containing a single or multiple rings. Several aryl rings may be linked together, for example through ether linkages, sulfone linkages or more than one sulfone linkages. The aryl rings may also be fused.

In alternative embodiments, the amine groups of the aryl diamino sulfone can be meta or para to the sulfone linkage, for example, as in formula (17):

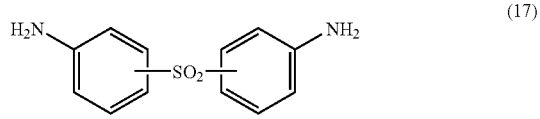

Aromatic diamines include, but are not limited to, for example, diamino diphenyl sulfone (DDS) and bis(aminophenoxy phenyl) sulfones (BAPS). The oxy diphthalic anhydrides described above may be used to form polyimide linkages by reaction with an aryl diamino sulfone to produce polysulfone etherimides.

In some embodiments the polysulfone etherimide resins may be prepared from reaction of an aromatic dianhydride monomer (or aromatic bis(ether anhydride)monomer) with an organic diamine monomer wherein the two monomers are present in essentially equimolar amounts, or wherein one monomer is present in the reaction mixture at 20% or less molar excess, and, in alternative embodiments, 10% or less molar excess in relation to the other monomer, or wherein one monomer is present in the reaction mixture at no more than 5% molar excess. In other embodiments the monomers will be present in amounts differing by less than 1% molar excess.

Primary monoamines may be used to end-cap or chain-stop the polysulfone etherimide, for example, to control molecular weight. In a particular embodiment primary monoamines include aromatic primary monoamines, illustrative examples of which include aniline, chloroaniline, perfluoromethyl aniline, naphthyl amines and the like. Aromatic primary monoamines may have additional functionality bound to the aromatic ring: such as, but not limited to, aryl groups, alkyl groups, aryl-alkyl groups, sulfone groups, ester groups, amide groups, halogens, halogenated alkyl or aryl groups, alkyl ether groups, aryl ether groups, or aryl keto groups. The attached functionality should not impede the function of the aromatic primary monoamine to control polysulfone etherimide molecular weight. Suitable monoamine compounds are listed in U.S. Pat. No. 6,919,422.

Aromatic dicarboxylic acid anhydrides, that is aromatic groups including one cyclic anhydride group, may also be used to control molecular weight in polyimide sulfones. Illustrative examples include phthalic anhydride, substituted phthalic anhydrides, such as chlorophthalic anhydride, and the like. Said anhydrides may have additional functionality bound to the aromatic ring, illustrative examples of which include those functionalities described above for aromatic primary monoamines.

In some instances polysulfone etherimides with low levels of isoalkylidene linkages may be desirable. It is believed that in some PAEK blends the presence of isoalkylidene linkages may promote miscibility, which could reduce load bearing capability at high temperature and would be undesirable. Miscible PEEK blends with isoalkylidene containing polymer are described, for example, U.S. Pat. Nos. 5,079,309 and 5,171,796. In some instances low levels of isoalkylidene groups can mean less that 30 mole % of the polysulfone etherimide linkages will contain isoalkylidene groups, in other instances the polysulfone etherimide linkages will contain less than 20 mole % isoalkylidene groups. In still other instances less than 10 mole % isoalkylidene groups will be present in the polysulfone etherimide linkages.

Polysulfone etherimides may have a melt index of 0.1 to 10 grams per minute (g/min), as measured by American Society for Testing Materials (ASTM) D1238 at 340-425° C. In a one embodiment, the polysulfone etherimide resin has a weight average molecular weight (Mw) of 10,000 to 150,000 grams per mole (g/mole), as measured by gel permeation chromatography, using a polystyrene standard. In another embodiment the polysulfone etherimide has Mw of 20,000 to 60,000 g/mole.

Thermoplastic polyetherimides, particularly those polyetherimides that are melt processable, such as those whose preparation and properties are described in U.S. Pat. Nos. 3,803,085 and 3,905,942, may also be used in blends according to the present invention.

Exemplary polyetherimide resins include more than 1, typically 10 to 1,000, or more specifically, 10 to 500 structural units, of the formula (18):

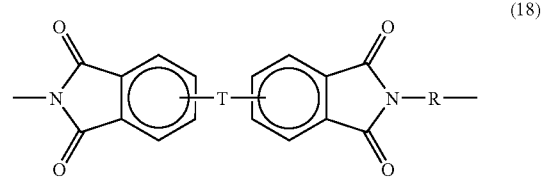

wherein T is —O— or a group of the formula —O—Z—O— wherein the divalent bonds of the —O— or the —O—Z—O— group are in the 3,3', 3,4', 4,3', or the 4,4' positions, and wherein Z includes, but is not limited, to divalent radicals of formulas (19):

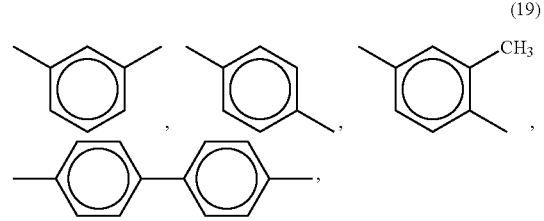

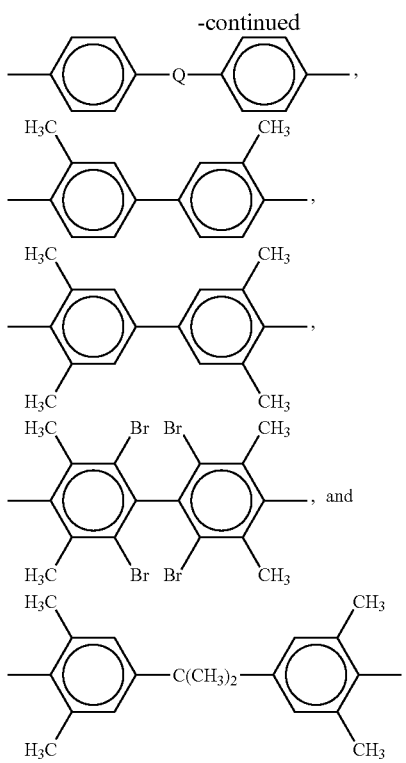

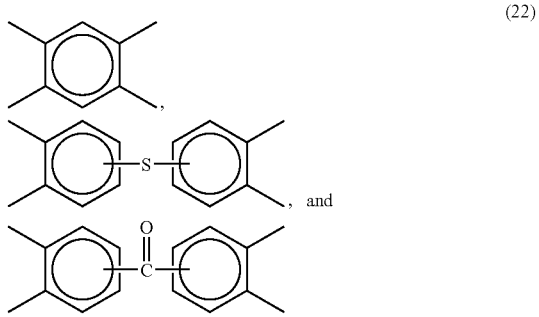

(22)

M includes, but is not limited to, radicals of formulas (22):

The polyetherimide may be prepared by various methods, including, but not limited to, the reaction of an aromatic bis(ether anhydride) of the formula (23):

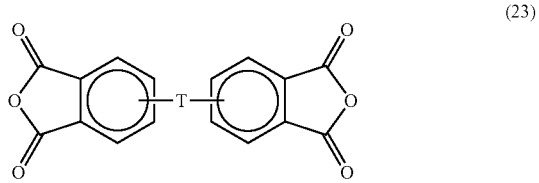

(23)

with an organic diamine of the formula (24):

$$H_2N-R-NH_2 \qquad (24)$$

wherein R and T are defined in relation to formulas (19) above.

Examples of specific aromatic bis(ether anhydride)s and organic diamines are disclosed, for example, in U.S. Pat. Nos. 3,972,902 and 4,455,410. Illustrative examples of dianhydride molecules for use in the present invention include all of those dianhydrides set forth above for use in a polysulfone etherimide. The skilled artisan will appreciate that the dianhydride for use in the polyetherimide may be the same or different that the polyetherimide used in the polysulfone etherimide, with the caveat that the considerations made to determine which dianhydride will be used for the polyetherimide may be separate and distinct from the considerations which will be used to choose a dianhydride for use in the polysulfone etherimide.

The bis(ether anhydride)s may be prepared by the hydrolysis, followed by dehydration, of the reaction product of a nitro substituted phenyl dinitrile with a metal salt of a bisphenol compound (e.g., BPA) in the presence of a dipolar, aprotic solvent. An exemplary class of aromatic bis(ether anhydride)s included by formula (23) above includes, but is not limited to, compounds wherein T is of the formula (25):

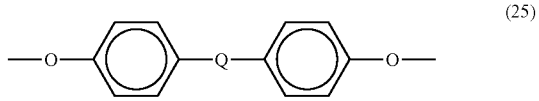

(25)

and the ether linkages, for example, are in the 3,3', 3,4', 4,3', or 4,4' positions, and mixtures including at least one of the foregoing, and where Q is as defined above.

Any diamino compound may be employed. Examples of suitable compounds are those diamino molecules set forth wherein Q includes but is not limited to a divalent moiety including —O—, —S—, —C(O)—, —SO$_2$—, —SO—, —C$_y$H$_{2y}$— (y being an integer from 1 to 5), and halogenated derivatives thereof, including perfluoroalkylene groups.

In one embodiment, the polyetherimide may be a copolymer that, in addition to the etherimide units described above, further contains polyimide structural units of the formula (20):

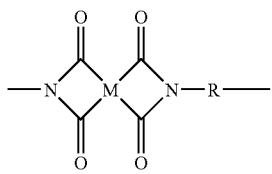

(20)

wherein R is as previously defined for formula but is not limited to substituted or unsubstituted divalent organic radicals such as: (a) aromatic hydrocarbon radicals having 6 to 20 carbon atoms and halogenated derivatives thereof, (b) straight or branched chain alkylene radicals having 2 to 20 carbon atoms; (c) cycloalkylene radicals having 3 to 20 carbon atoms, or (d) divalent radicals of the general formula (21):

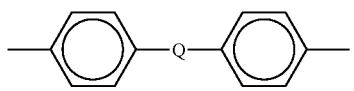

(21)

wherein Q includes but is not limited to a divalent moiety including —O—, —S—, —C(O)—, —SO$_2$—, —SO—, —C$_y$H$_{2y}$— (y being an integer from 1 to 5), and halogenated derivatives thereof, including perfluoroalkylene groups.

above for use in a polysulfone etherimide. The skilled artisan will appreciate that the diamino moieties for use in the polyetherimide may be the same or different that the polyetherimide used in the polysulfone etherimide, with the caveat that the considerations made to determine which diamino compounds will be used for the polyetherimide may be separate and distinct from the considerations which will be used to choose a diamino for use in the polysulfone etherimide.

In one embodiment, the polyetherimide resin includes structural units according to formula 19 wherein each R is independently p-phenylene or m-phenylene or a mixture including at least one of the foregoing and T is a divalent radical of the formula (26):

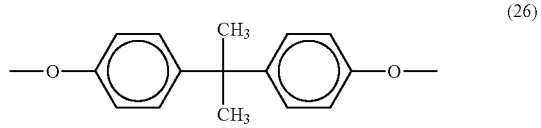
(26)

Included among the many methods of making the polyimides, particularly polyetherimides, are those disclosed in U.S. Pat. Nos. 3,847,867, 3,850,885, 3,852,242, 3,855,178, 3,983,093, and 4,443,591.

The reactions may be carried out employing solvents, e.g., o-dichlorobenzene, m-cresol/toluene and the like, to effect a reaction between the anhydride of formula (25) and the diamine of formula (26), at temperatures of approximately 100° C. to 250° C. Alternatively, the polyetherimide may be prepared by melt polymerization of aromatic bis(ether anhydride)s (25) and diamines (26) by heating a mixture of the starting materials to elevated temperatures with concurrent stirring. Generally, melt polymerizations employ temperatures of approximately 200° C. to 400° C. Chain stoppers and branching agents may also be employed in the reaction.

When polyetherimide/polyimide copolymers are employed, a dianhydride, such as pyromellitic anhydride, is used in combination with the bis(ether anhydride). The polyetherimide resins can optionally be prepared from reaction of an aromatic bis(ether anhydride) with an organic diamine in which the diamine is present in the reaction mixture at less than or equal to 0.2 molar excess. Under such conditions the polyetherimide resin may have less than or equal to 15 microequivalents per gram (µeq/g) acid titratable groups, or, more specifically less than or equal 10 µeq/g acid titratable groups, as shown by titration with chloroform solution with a solution of 33 weight percent (wt %) hydrobromic acid in glacial acetic acid. Acid-titratable groups are essentially due to amine end-groups in the polyetherimide resin.

One route for the synthesis of polyetherimides proceeds through a bis(4-halophthalimide) having the following structure (27):

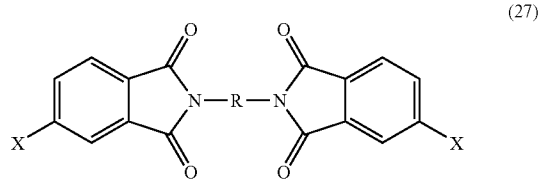
(27)

wherein R is as described above and X is a halogen. The bis(4-halophthalimide) wherein R is a 1,3-phenyl group (20) is particularly useful.

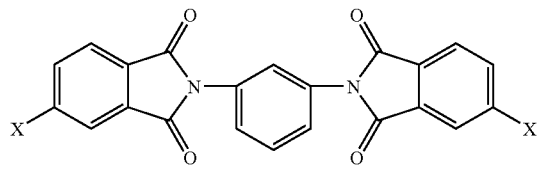
(28)

Bis(halophthalimide)s (28) and (29) are typically formed by the condensation of amines, e.g., 1,3-diaminobenzene with anhydrides, e.g., 4-halophthalic anhydride (29):

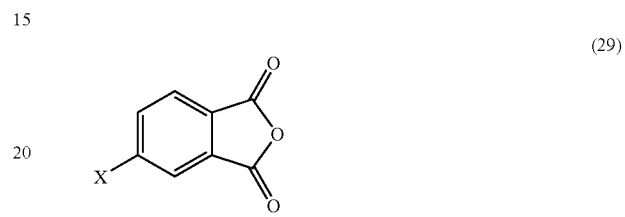
(29)

Polyetherimides may be synthesized by the reaction of the bis(halophthalimide) with an alkali metal salt of a bisphenol such as bisphenol A or a combination of an alkali metal salt of a bisphenol and an alkali metal salt of another dihydroxy substituted aromatic hydrocarbon in the presence or absence of phase transfer catalyst. Suitable phase transfer catalysts are disclosed in U.S. Pat. No. 5,229,482. Suitable dihydroxy substituted aromatic hydrocarbons include those having the formula (30):

OH-A$^2$-OH  (30)

wherein A$^2$ is a divalent aromatic hydrocarbon radical. Suitable A$^2$ radicals include m-phenylene, p-phenylene, 4,4'-biphenylene, and similar radicals.

Examples of some polyetherimides are listed in ASTM D5205 "Standard Classification System for Polyetherimide (PEI) Materials".

Polysulfones according to the definition above may be used in the polymer blend according to the present invention. These sulfones also include the thermoplastic polysulfones, polyethersulfones and polyphenylene ether sulfones prepared as described in U.S. Pat. Nos. 3,634,355, 4,008,203, 4,108,837 and 4,175,175.

Polyaryl ether sulfones, also referred to as polysulfones, polyether sulfones and polyphenylene ether sulfones are linear thermoplastic polymers that possess a number of attractive features such as high temperature resistance, good electrical properties, and good hydrolytic stability. A variety of polyaryl ether sulfones are commercially available, including the polycondensation product of dihydroxy diphenyl sulfone with dichloro diphenyl sulfone and known as polyether sulfone (PES) resin, and the polymer of bisphenol-A and dichloro diphenyl sulfone known in the art as polysulfone (PSu or PSF) resin.

Other polyaryl ether sulfones are the polybiphenyl ether sulfone resins, available from Solvay Inc. under the trademark of RADEL R resin. This resin may be described as the product of the polycondensation of biphenol with 4,4'-dichlorodiphenyl sulfone and also is known and described in the art, for example, in Canadian Patent No. 847,963.

Polysulfones are sold by Solvay Co. under the UDEL trade name. Polyethersulfones are sold by Solvay under the RADEL A trade names and by BASF Co, as ULTRASON E. A variety of PES copolymers, for example including bisphenol A (BPA) moieties, other bisphenols and diphenyl sulfone moieties in molar ratios other than 1:1, may also be found.

Methods for the preparation of polyaryl ether sulfones are widely known and several suitable processes have been well described in the art. Two methods, the carbonate method and the alkali metal hydroxide method, are known and used for this purpose. In the alkali metal hydroxide method, a double alkali metal salt of a dihydric phenol is contacted with a dihalobenzenoid compound in the presence of a dipolar, aprotic solvent under substantially anhydrous conditions. The carbonate method, in which at least one dihydric phenol and at least one dihalobenzenoid compound are heated, for example, with sodium carbonate or bicarbonate and a second alkali metal carbonate or bicarbonate is also disclosed in the art, for example in U.S. Pat. No. 4,176,222. Alternatively, the polybiphenyl ether sulfone, PSu and PES resin components may be prepared by any of the variety of methods known in the art for the preparation of polyaryl ether resins.

The molecular weight of the polysulfone, as indicated by reduced viscosity data in an appropriate solvent such as methylene chloride, chloroform, N-methylpyrrolidone, or the like, will be at least 0.3 dl/g, preferably at least 0.4 dl/g and, typically, will not exceed 1.5 dl/g. In some instances the polysulfone weight average molecular weight can vary from 10,000 to 100,000. Polysulfone resins may have glass transition temperatures from 180 to 250° C. in some instances. Polysulfone resins are further described in ASTM D6394-05 Standard Specification for Sulfone Plastics.

In addition to the components of the resin blend, the filled compositions of the present invention also include at least one filler. The filler is selected based upon one or more chosen properties and/or uses of the filled compositions. For example, if it is desired to include a colorant, one or more colorants, dyes, pigments or the like may be included. Alternatively, or in addition thereto, if flame retardancy is desired, one or more flame retardant materials may also be included in the filled compositions. The amount and/or type of filler added may vary based upon one or more factors including, but not limited to, the selected characteristic or characteristics of the filled composition, the amount and/or type of the resins in the resin blend, the type of article to be made using the filled composition and/or the type of process used to make the filled composition and/or the article to be made.

In another aspect, in beneficial embodiments, the fillers do not substantially dissipate under higher temperatures. Accordingly, the fillers used in the present invention have, in one embodiment, a weight loss (under nitrogen) of 10% or less at 300 C, as determined by thermal gravimetric analyses (TGA); ASTM method E1868. In another embodiment, the fillers used in the present invention have a weight loss (under nitrogen) of 5% or less at 300 C, as determined by thermal gravimetric analyses (TGA); ASTM method E1868.

Accordingly, the filled compositions of the invention include one or more fillers selected from glass fillers and fibers; carbon fillers and fibers; aramid fillers and fibers; metallic fillers and fibers; metal-coated fibers; natural fillers and fibers; minerals; stabilizers; colorants; nanofillers and nanofibers; lubricants; impact modifiers; flame retardants; mold release agents; processing aids; coupling agents; high specific gravity materials; and blends and/or mixtures including one or more of the foregoing fillers.

In one embodiment, the filler is a reinforcing agent or fiber. Suitable fillers or reinforcing agents include, for example, $TiO_2$; fibers, such as asbestos, carbon fibers, or the like; silicates and silica powders, such as aluminum silicate (mullite), synthetic calcium silicate, zirconium silicate, fused silica, crystalline silica graphite, natural silica sand, or the like; boron powders such as boron-nitride powder, boron-silicate powders, or the like; alumina; magnesium oxide (magnesia); calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin including various coatings known in the art to facilitate compatibility with the polymeric matrix resin, or the like; single crystal fibers or "whiskers" such as silicon carbide, alumina, boron carbide, iron, nickel, copper, or the like; glass fibers, (including continuous and chopped fibers), such as E, A, C, ECR, R, S, D, and NE glasses and quartz, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper, tungsten and nickel or the like; flaked fillers such as glass flakes, flaked silicon carbide, aluminum diboride, aluminum flakes, steel flakes or the like; fibrous fillers, for example short inorganic fibers such as those derived from blends including at least one of aluminum silicates, aluminum oxides, magnesium oxides, and calcium sulfate hemihydrate or the like; natural fillers and reinforcements, such as wood flour obtained by pulverizing wood, fibrous products such as cellulose, hemp, cotton, sisal, jute, starch, cork flour, lignin, ground nut shells, corn, rice grain husks or the like; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly (vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations including at least one of the foregoing fillers or reinforcing agents. One or more of these fillers may be added from 1 to 98% by weight of the total composition, excluding any filler. In another embodiment, one or more of these fillers may be added from 1 to 70% by weight of the total composition, excluding any filler.

A particularly suitable embodiment of fillers includes reinforcing fibers such as glass, ceramic and carbon and are generally well known in the art, as are their methods of manufacture. In one embodiment, glass is particularly suitable, especially glass that is relatively soda free. Fibrous glass filaments comprised of lime-alumino-borosilicate glass, which is also known as "E" glass are often especially suitable. Glass fiber is added to the composition to increase the flexural modulus and strength. The glass filaments can be made by standard processes, e.g., by steam or air blowing, flame blowing and mechanical pulling. The preferred filaments for plastic reinforcement are made by mechanical pulling. For achieving optimal mechanical properties fiber diameter between 6-20 microns are required with a diameter of from 10-15 microns being preferred. In preparing the molding compositions it is convenient to use the fiber in the form of chopped strands of from about ⅛" (3 mm) to about ½" (13 mm) long although roving may also be used. In articles molded from the compositions, the fiber length is typically shorter presumably due to fiber fragmentation during compounding of the composition. The length of such short glass fibers present in final molded compositions is less than about 4 mm. The fibers may be treated with a variety of coupling agents to improve adhesion to the resin matrix. Preferred coupling agents include; amino, epoxy, amide or mercapto functionalized silanes. Organo metallic coupling agents, for example, titanium or zirconium based organo metallic compounds, may also be used. Other preferred sizing-coated glass fibers are commercially available from Owens Corning Fiberglass as, for example, OCF K filament glass fiber 183F.

In another embodiment, long glass fibers can be used, wherein a continuous glass fiber bundle containing glass fiber monofilaments having a diameter in the range, 10-24 µm, preferably 13-18 µm is impregnated with a melted thermoplastic. After cooling, the impregnated bundle is cut into pellets having a length of >5 mm, preferably, above >9 mm. These pellets can be incorporated into the compositions of the invention, to get long fiber glass reinforced polyester compositions. The length of long glass fiber present in molded composition prepared by this method is typically greater than that prepared by incorporation of short fibers and the predominant portion of the long glass fibers present have a length >4 mm in the molded part. Such long fiber glass reinforced compositions can be used for different molding techniques such as injection molding, compression molding, thermoforming and the like. As in the case of short fibers, the long fibers may also be treated with a variety of coupling agents to improve adhesion to resin. For those skilled in the art, a continuous process such as pultrusion technique for direct incorporation of long glass fibers in compositions will also be possible.

In another embodiment, the filler is an impact modifier. Suitable impact modifiers include an elastomer-modified graft copolymer including (i) an elastomeric (i.e., rubbery) polymer substrate having a Tg below 0° C., more specifically from −40° to −80° C., and (ii) a rigid polymeric superstrate grafted to the elastomeric polymer substrate. As is known, elastomer-modified graft copolymers may be prepared by first providing an elastomeric polymeric backbone. At least one grafting monomer, and in alternative embodiments two monomers, are then polymerized in the presence of the polymer backbone to obtain the graft copolymer.

Depending on the amount of elastomer-modified polymer present, a separate matrix or continuous phase of ungrafted rigid polymer or copolymer may be simultaneously obtained along with the elastomer-modified graft copolymer. Typically, such impact modifiers include from 40 to 95 wt. % elastomer-modified graft copolymer and from 5 to 65 wt. % graft (co)polymer, based on the total weight of the impact modifier. In another embodiment, such impact modifiers include from 50 to 85 wt. %, more specifically from 75 to 85 wt. % rubber-modified graft copolymer, together with from 15 to 50 wt. %, more specifically from 15 to 25 wt. % graft (co)polymer, based on the total weight of the impact modifier. The ungrafted rigid polymers or copolymers may also be separately prepared, for example by radical polymerization, in particular by emulsion, suspension, solution or bulk polymerization, and added to the impact modifier composition or polycarbonate composition. Such ungrafted rigid polymers or copolymers can have number average molecular weights of from 20,000 to 200,000.

Suitable materials for use as the elastomeric polymer backbone include, for example, conjugated diene rubbers; copolymers of a conjugated diene with less than 50 wt. % of a copolymerizable monomer; $C_{1-8}$ alkyl (meth)acrylate elastomers; olefin rubbers such as ethylene propylene copolymers (EPR) or ethylene-propylene-diene monomers (EPDM); silicone rubbers; elastomeric $C_{1-8}$ alkyl (meth)acrylates; elastomeric copolymers of $C_{1-8}$ alkyl (meth)acrylates with butadiene and/or styrene; or combinations including at least one of the foregoing elastomers.

Suitable conjugated diene monomers for preparing the elastomer backbone are of formula (31):

wherein each $X^b$ is independently hydrogen, $C_1$-$C_5$ alkyl, or the like. Examples of conjugated diene monomers that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as mixtures including at least one of the foregoing conjugated diene monomers. Specific conjugated diene homopolymers include polybutadiene and polyisoprene.

Copolymers of a conjugated diene rubber may also be used, for example those produced by aqueous radical emulsion polymerization of a conjugated diene and one or more monomers copolymerizable therewith. Monomers that are suitable for copolymerization with the conjugated diene include monovinylaromatic monomers containing condensed aromatic ring structures, such as vinyl naphthalene, vinyl anthracene and the like, and monomers of formula (32):

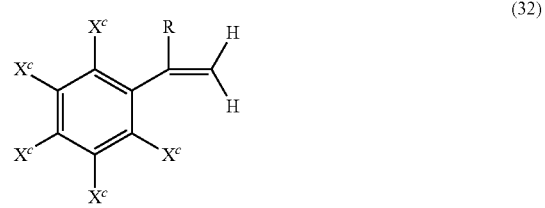

wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ aralkyl, $C_7$-$C_{12}$ alkaryl, $C_1$-$C_{12}$ alkoxy, $C_3$-$C_{12}$ cycloalkoxy, $C_6$-$C_{12}$ aryloxy, chloro, bromo, or hydroxy, and R is hydrogen, $C_1$-$C_5$ alkyl, bromo, or chloro. Examples of the suitable monovinylaromatic monomers that may be used include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetrachlorostyrene, combinations including at least one of the foregoing compounds, and the like. Styrene and/or alpha-methylstyrene are commonly used as monomers copolymerizable with the conjugated diene monomer. Mixtures of the foregoing monovinyl monomers and monovinylaromatic monomers may also be used.

Other monomers that may be copolymerized with the conjugated diene are monovinylic monomers such as itaconic acid, acrylamide, N-substituted acrylamide or methacrylamide, maleic anhydride, maleimide, N-alkyl, aryl or haloaryl substituted maleimide, glycidyl (meth)acrylates, and monomers of the general formula (33):

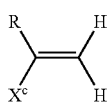

(33)

wherein R is as previously defined and $X^c$ is cyano, $C_1$-$C_{12}$ alkoxycarbonyl, $C_1$-$C_{12}$ aryloxycarbonyl, or the like. Examples of monomers of formula (35) include acrylonitrile, ethacrylonitrile, methacrylonitrile, alpha-chloroacrylonitrile, beta-chloroacrylonitrile, alpha-bromoacrylonitrile, methyl acrylate, methyl methacrylate, ethyl acrylate, n-butyl acrylate, n-butyl methacrylate, propyl acrylate, isopropyl acrylate, 2-ethylhexyl acrylate, combinations including at least one of the foregoing monomers, and the like. Monomers such as n-butyl acrylate, ethyl acrylate, and 2-ethylhexyl acrylate are commonly used as monomers copolymerizable with the conjugated diene monomer.

Suitable (meth)acrylate rubbers suitable for use as the elastomeric polymer backbone may be cross-linked, particulate emulsion homopolymers or copolymers of $C_{1-8}$ alkyl (meth) acrylates, in particular $C_{4-6}$ alkyl acrylates, optionally in admixture with up to 15 wt. % of comonomers such as styrene, methyl methacrylate, butadiene, isoprene, vinyl methyl ether or acrylonitrile, and mixtures including at least one of the foregoing comonomers. Optionally, up to 5 wt. % a polyfunctional crosslinking comonomer may be present, for example divinylbenzene, alkylenediol di(meth)acrylates such as glycol bisacrylate, alkylenetriol tri(meth)acrylates, polyester di(meth)acrylates, bisacrylamides, triallyl cyanurate, triallyl isocyanurate, allyl (meth)acrylate, diallyl maleate, diallyl fumarate, diallyl adipate, triallyl esters of citric acid, triallyl esters of phosphoric acid, and the like, as well as combinations including at least one of the foregoing crosslinking agents.

The elastomeric polymer substrate may be in the form of either a block or random copolymer. The particle size of the substrate is not critical, for example, an average particle size of 0.05 to 8 micrometers, more specifically 0.1 to 1.2 micrometers, still more specifically 0.2 to 0.8 micrometers, for emulsion based polymerized rubber lattices or 0.5 to 10 microns, specifically 0.6 to 1.5 microns, for mass polymerized rubber substrates which also have included grafted monomer occlusions. Particle size may be measured by simple light transmission methods or capillary hydrodynamic chromatography (CHDF). The rubber substrate may be a particulate, moderately cross-linked conjugated diene or $C_{4-6}$ alkyl acrylate rubber, and, in alternative embodiments, has a gel content greater than 70%. Also suitable are mixtures of conjugated diene and $C_{4-6}$ alkyl acrylate rubbers.

In the preparation the elastomeric graft copolymer, the elastomeric polymer backbone may include from 40 to 95 wt. % of the total graft copolymer, more specifically from 50 to 85 wt. %, and even more specifically from 75 to 85 wt. % of the elastomer-modified graft copolymer, the remainder being the rigid graft phase.

The elastomer-modified graft polymers may be polymerized by mass, emulsion, suspension, solution or combined processes such as bulk-suspension, emulsion-bulk, bulk-solution or other techniques, using continuous, semibatch, or batch processes.

In one embodiment, the elastomer-modified graft polymer may be obtained by graft polymerization of a mixture including a monovinylaromatic monomer and optionally one or more comonomers in the presence of one or more elastomeric polymer substrates. The above-described monovinylaromatic monomers may be used in the rigid graft phase, including styrene, alpha-methyl styrene, halostyrenes such as dibromostyrene, vinyltoluene, vinylxylene, butylstyrene, para-hydroxystyrene, methoxystyrene, or combinations including at least one of the foregoing monovinylaromatic monomers. The monovinylaromatic monomers may be used in combination with one or more comonomers, for example the above-described monovinylic monomers and/or monomers of the general formula (35). In one specific embodiment, the monovinylaromatic monomer is styrene or alpha-methyl styrene, and the comonomer is acrylonitrile, ethyl acrylate, and/or methyl methacrylate. In another specific embodiment, the rigid graft phase may be a copolymer of styrene and acrylonitrile, a copolymer of alpha-methylstyrene and acrylonitrile, or a methyl methacrylate homopolymer or copolymer. Specific examples of such elastomer-modified graft copolymers include but are not limited to acrylonitrile-butadiene-styrene (ABS), acrylonitrile-styrene-butyl acrylate (ASA), methyl methacrylate-acrylonitrile-butadiene-styrene (MABS), and methyl methacrylate-butadiene-styrene (MBS), and acrylonitrile-ethylene-propylene-diene-styrene (AES). Acrylonitrile-butadiene-styrene graft copolymers are well known in the art and many are commercially available, including, for example, the high-rubber acrylonitrile-butadiene-styrene resins available from General Electric Company as BLENDEX® grades 131, 336, 338, 360, and 415.

In another embodiment the impact modifier has a core-shell structure wherein the core is an elastomeric polymer substrate and the shell is a rigid thermoplastic polymer that is readily wet by the polycarbonate. The shell may merely physically encapsulate the core, or the shell may be partially or essentially completely grafted to the core. More specifically, the shell comprises the polymerization product of a monovinylaromatic compound and/or a monovinylic monomer or an alkyl (meth)acrylate.

An example of a suitable impact modifier of this type may be prepared by emulsion polymerization and is free of basic materials such as alkali metal salts of $C_{6-30}$ fatty acids, for example sodium stearate, lithium stearate, sodium oleate, potassium oleate, and the like, alkali metal carbonates, amines such as dodecyl dimethyl amine, dodecyl amine, and the like, and ammonium salts of amines. Such materials are commonly used as surfactants in emulsion polymerization, and may catalyze transesterification and/or degradation of polycarbonates. Instead, ionic sulfate, sulfonate, or phosphate surfactants may be used in preparing the impact modifiers, particularly the elastomeric substrate portion of the impact modifiers. Suitable surfactants include, for example, $C_{1-22}$ alkyl or $C_{7-25}$ alkylaryl sulfonates, $C_{1-22}$ alkyl or $C_{7-25}$ alkylaryl sulfates, $C_{1-22}$ alkyl or $C_{7-25}$ alkylaryl phosphates, substituted silicates, and mixtures thereof A specific surfactant is a $C_{6-16}$, specifically a $C_{8-12}$ alkyl sulfonate. This emulsion polymerization process is described and disclosed in various patents and literature of such companies as Rohm & Haas and General Electric Company. In the practice, any of the above-described impact modifiers may be used providing it is free of the alkali metal salts of fatty acids, alkali metal carbonates, and other basic materials. A specific impact modifier of this type is an MBS impact modifier wherein the butadiene substrate is prepared using above-described sulfonates, sulfates, or phosphates as surfactants. It is also beneficial that the impact modifier have a pH of 3 to 8, specifically from 4 to 7.

Another specific type of elastomer-modified impact modifier composition comprises structural units derived from: at least one silicone rubber monomer, a branched acrylate rubber monomer having the formula $H_2C=C(R^d)C(O)$ OCH$_2$CH$_2$R$^e$, wherein R$^d$ is hydrogen or a C$_1$-C$_8$ linear or branched hydrocarbyl group and R$^e$ is a branched C$_3$-C$_{16}$ hydrocarbyl group; a first graft link monomer; a polymerizable alkenyl-containing organic material; and a second graft link monomer. The silicone rubber monomer may include, for example, a cyclic siloxane, tetraalkoxysilane, trialkoxysilane, (acryloxy)alkoxysilane, (mercaptoalkyl)alkoxysilane, vinylalkoxysilane, or allylalkoxysilane, alone or in combination, e.g., decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane, octaphenylcyclotetrasiloxane, octamethylcyclotetrasiloxane and/or tetraethoxysilane.

Exemplary branched acrylate rubber monomers include iso-octyl acrylate, 6-methyloctyl acrylate, 7-methyloctyl acrylate, 6-methylheptyl acrylate, and the like, alone or in combination. The polymerizable alkenyl-containing organic material may be, for example, a monomer of formula (34) or (35), e.g., styrene, alpha-methylstyrene, acrylonitrile, methacrylonitrile, or an unbranched (meth)acrylate such as methyl methacrylate, 2-ethylhexyl methacrylate, methyl acrylate, ethyl acrylate, n-propyl acrylate, or the like, alone or in combination.

The at least one first graft link monomer may be an (acryloxy)alkoxysilane, a (mercaptoalkyl)alkoxysilane, a vinylalkoxysilane, or an allylalkoxysilane, alone or in combination, e.g., (gamma-methacryloxypropyl)(dimethoxy)methylsilane and/or (3-mercaptopropyl)trimethoxysilane. The at least one second graft link monomer is a polyethylenically unsaturated compound having at least one allyl group, such as allyl methacrylate, triallyl cyanurate, or triallyl isocyanurate, alone or in combination.

The silicone-acrylate impact modifier compositions can be prepared by emulsion polymerization, wherein, for example at least one silicone rubber monomer is reacted with at least one first graft link monomer at a temperature from 30° C. to 110° C. to form a silicone rubber latex, in the presence of a surfactant such as dodecylbenzenesulfonic acid. Alternatively, a cyclic siloxane such as cyclooctamethyltetrasiloxane and an tetraethoxyorthosilicate may be reacted with a first graft link monomer such as (gamma-methacryloxypropyl) methyldimethoxysilane, to afford silicone rubber having an average particle size from 100 nanometers to 2 microns. At least one branched acrylate rubber monomer is then polymerized with the silicone rubber particles, optionally in presence of a cross linking monomer, such as allylmethacrylate in the presence of a free radical generating polymerization catalyst such as benzoyl peroxide. This latex is then reacted with a polymerizable alkenyl-containing organic material and a second graft link monomer. The latex particles of the graft silicone-acrylate rubber hybrid may be separated from the aqueous phase through coagulation (by treatment with a coagulant) and dried to a fine powder to produce the silicone-acrylate rubber impact modifier composition. This method can be generally used for producing the silicone-acrylate impact modifier having a particle size from 100 nanometers to two micrometers.

The thermoplastic composition may further include other thermoplastic polymers, for example the rigid polymers as described above without the elastomer modification, and/or the elastomers as described above without the rigid polymeric grafts. Suitable rigid thermoplastic polymers generally have a Tg greater than 0° C., preferably greater than 20° C., and include, for example, polymers derived from monovinylaromatic monomers containing condensed aromatic ring structures, such as vinyl naphthalene, vinyl anthracene and the like, or monomers of formula (34), for example styrene and alpha-methyl styrene; monovinylic monomers such as itaconic acid, acrylamide, N-substituted acrylamide or methacrylamide, maleic anhydride, maleimide, N-alkyl, aryl or haloaryl substituted maleimide, glycidyl (meth)acrylates; and monomers of the general formula (35), for example acrylonitrile, methyl acrylate and methyl methacrylate; and copolymers of the foregoing, for example styrene-acrylonitrile (SAN), methyl methacrylate-acrylonitrile-styrene, and methyl methacrylate-styrene.

The amount of impact modifiers added to the thermoplastic compositions of the present invention may be based on the selected impact characteristics of the compositions as well as molded articles made from these compositions. In one embodiment, the impact modifier is present in amounts of up to 25 wt. %. In another embodiment, the impact modifier is present in amounts from 1 to 20 wt. %. In still another embodiment, the impact modifier is present in amounts from 5 to 15 wt. %.

Impact modifiers with good thermal stability may be preferred in some instances. In a beneficial embodiment, impact modifiers that do not substantially dissipate or decompose under higher temperatures are preferred. Accordingly, the impact modifiers used in the present invention have, in one embodiment, a weight loss (under nitrogen) of 10% or less at 250 C, as determined by thermal gravimetric analyses (TGA); ASTM method E1868. In another embodiment, the impact modifiers used in the present invention have a weight loss (under nitrogen) of 10% or less at 300 C, as determined by thermal gravimetric analyses (TGA); ASTM method E1868.

In still another embodiment, the composition may include a lubricant. Suitable lubricants include for example, fatty acid esters such as alkyl stearyl esters, e.g., methyl stearate or the like; mixtures of methyl stearate and hydrophilic and hydrophobic surfactants including polyethylene glycol polymers, polypropylene glycol polymers, and copolymers thereof e.g., methyl stearate and polyethylene-polypropylene glycol copolymers in a suitable solvent; or combinations including at least one of the foregoing lubricants. Lubricants are generally used in amounts of from 0.1 to 40 parts by weight, based on 100 parts by weight of the total composition, excluding any filler.

In yet another embodiment, the composition may include a heat stabilizer. Suitable heat stabilizers include, for example, organo phosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations including at least one of the foregoing heat stabilizers. Heat stabilizers are generally used in amounts of from 0.01 to 10 parts by weight based on 100 parts by weight of the total composition, excluding any filler.

In still another embodiment, the composition may include a UV absorber. Suitable UV absorbers include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl)oxy]-2,2-bis[[(2-cyano-3,3-diphenylacryloyl)oxy] methyl]propane (UVINUL™ 3030); 2,2'-(1,4-phenylene)bis (4H-3,1-benzoxazin-4-one); 1,3-bis[(2-cyano-3,3-diphenylacryloyl)oxy]-2,2-bis[[(2-cyano-3,3- diphenylacryloyl)oxy]methyl]propane; nano-size inorganic materials such as titanium oxide, cerium oxide, and zinc oxide, all with particle size less than 100 nanometers; or the like, or combinations including at least one of the foregoing UV absorbers. UV absorbers are generally used in amounts of from 0.01 to 10 parts by weight, based on 100 parts by weight based on 100 parts by weight of the total composition, excluding any filler.

In yet another embodiment, the composition includes a pigment. Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates; sulfates and chromates; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations including at least one of the foregoing pigments. Pigments are generally used in amounts of from 0.01 to 20 parts by weight, based on 100 parts by weight based on 100 parts by weight of the total composition, excluding any filler.

In still another embodiment, the composition includes a dye. Suitable dyes include, for example, organic dyes such as coumarin 460 (blue), coumarin 6 (green), nile red or the like; lanthanide complexes; hydrocarbon and substituted hydrocarbon dyes; polycyclic aromatic hydrocarbons; scintillation dyes (preferably oxazoles and oxadiazoles); aryl- or heteroaryl-substituted poly (2-8 olefins); carbocyanine dyes; phthalocyanine dyes and pigments; oxazine dyes; carbostyryl dyes; porphyrin dyes; acridine dyes; anthraquinone dyes; arylmethane dyes; azo dyes; diazonium dyes; nitro dyes; quinone imine dyes; tetrazolium dyes; thiazole dyes; perylene dyes, perinone dyes; bis-benzoxazolylthiophene (BBOT); and xanthene dyes; fluorophores such as anti-stokes shift dyes which absorb in the near infrared wavelength and emit in the visible wavelength, or the like; luminescent dyes such as 5-amino-9-diethyliminobenzo(a)phenoxazonium perchlorate; 7-amino-4-methylcarbostyryl; 7-amino-4-methylcoumarin; 3-(2'-benzimidazolyl)-7-N,N-diethylaminocoumarin; 3-(2'-benzothiazolyl)-7-diethylaminocoumarin; 2-(4-biphenylyl)-5-(4-t-butylphenyl)-1,3,4-oxadiazole; 2-(4-biphenyl)-6-phenylbenzoxazole-1,3; 2,5-Bis-(4-biphenylyl)-1,3,4-oxadiazole; 2,5-bis-(4-biphenylyl)-oxazole; 4,4'-bis-(2-butyloctyloxy)-p-quaterphenyl; p-bis(o-methylstyryl)-benzene; 5,9-diaminobenzo(a) phenoxazonium perchlorate; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-diethylamino-4-methylcoumarin; 7-diethylamino-4-trifluoromethylcoumarin; 2,2'-dimethyl-p-quaterphenyl; 2,2-dimethyl-p-terphenyl; 7-ethylamino-6-methyl-4-trifluoromethylcoumarin; 7-ethylamino-4-trifluoromethylcoumarin; nile red; rhodamine 700; oxazine 750; rhodamine 800; IR 125; IR 144; IR 140; IR 132; IR 26; IR5; diphenylhexatriene; diphenylbutadiene; tetraphenylbutadiene; naphthalene; anthracene; 9,10-diphenylanthracene; pyrene; chrysene; rubrene; coronene; phenanthrene or the like, or combinations including at least one of the foregoing dyes. Dyes are generally used in amounts of from 0.01 to 20 parts by weight, based on 100 parts by weight of the total composition, excluding any filler. Colorants that are not fugitive from the polymer melt above 300 C are preferred as are colorants with a molecular weight above 500 daltons.

In yet another embodiment, the composition includes a colorant. Suitable colorants include, for example titanium dioxide, anthraquinones, perylenes, perinones, indanthrones, quinacridones, xanthenes, oxazines, oxazolines, thioxanthenes, indigoids, thioindigoids, naphthalimides, cyanines, xanthenes, methines, lactones, coumarins, bis-benzoxazolylthiophene (BBOT), napthalenetetracarboxylic derivatives, monoazo and disazo pigments, triarylmethanes, aminoketones, bis(styryl)biphenyl derivatives, and the like, as well as combinations including at least one of the foregoing colorants. Colorants are generally used in amounts of from 0.01 to 20 parts by weight, based on 100 parts by weight of the total composition, excluding any filler.

In still another embodiment, the composition includes a blowing agent. Suitable blowing agents include for example, low boiling halohydrocarbons and those that generate carbon dioxide; blowing agents that are solid at room temperature and when heated to temperatures higher than their decomposition temperature, generate gases such as nitrogen, carbon dioxide, ammonia gas, such as azodicarbonamide, metal salts of azodicarbonamide, 4,4' oxybis(benzenesulfonylhydrazide), sodium bicarbonate, ammonium carbonate, or the like, or combinations including at least one of the foregoing blowing agents. Blowing agents are generally used in amounts of from 1 to 20 parts by weight, based on 100 parts by weight of the total composition, excluding any filler.

In yet another embodiment, the composition includes a mold release agent. Suitable mold releasing agents include for example, stearyl stearate, pentaerythritol tetrastearate, beeswax, montan wax, paraffin wax, or the like, or combinations including at least one of the foregoing mold release agents. Mold releasing agents are generally used in amounts of from 0.1 to 10 parts by weight, based on 100 parts by weight of the total composition, excluding any filler.

In still another embodiment, the composition includes a material to improve flow and other properties may be added to the composition, such as low molecular weight hydrocarbon resins. Particularly useful classes of low molecular weight hydrocarbon resins are those derived from petroleum $C_5$ to $C_9$ feedstock that are derived from unsaturated $C_5$ to $C_9$ monomers obtained from petroleum cracking. Non-limiting examples include olefins, e.g. pentenes, hexenes, heptenes and the like; diolefins, e.g. pentadienes, hexadienes and the like; cyclic olefins and diolefins, e.g. cyclopentene, cyclopentadiene, cyclohexene, cyclohexadiene, methyl cyclopentadiene and the like; cyclic diolefin dienes, e.g., dicyclopentadiene, methylcyclopentadiene dimer and the like; and aromatic hydrocarbons, e.g. vinyltoluenes, indenes, methylindenes and the like. The resins can additionally be partially or fully hydrogenated. Low molecular weight hydrocarbon resins are generally used in amounts of from 0.1 to 10 parts by weight, based on 100 parts by weight of the total composition, excluding any filler.

In yet another embodiment, the composition includes a flame retardant. Suitable flame retardants include a phosphorus containing flame retardant, for example an organic phosphates and/or an organic compound containing phosphorus-nitrogen bonds. One type of exemplary organic phosphate is an aromatic phosphate of the formula $(GO)_3P=O$, wherein each G is independently an alkyl, cycloalkyl, aryl, alkaryl, or aralkyl group, provided that at least one G is an aromatic group. Two of the G groups may be joined together to provide a cyclic group, for example, diphenyl pentaerythritol diphosphate, which is described by Axelrod in U.S. Pat. No. 4,154, 775. Other suitable aromatic phosphates may be, for example, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

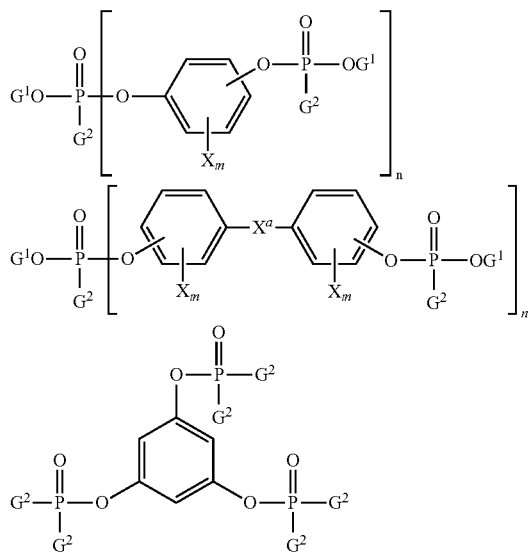

wherein each $G^1$ is independently a hydrocarbon having 1 to 30 carbon atoms; each $G^2$ is independently a hydrocarbon or hydrocarbonoxy having 1 to 30 carbon atoms; each X is independently a bromine or chlorine; m 0 to 4, and n is 1 to 30. Examples of suitable di- or polyfunctional aromatic phosphorus-containing compounds include resorcinol tetraphenyl diphosphate (RDP), the bis(diphenyl) phosphate of hydroquinone and the bis(diphenyl) phosphate of bisphenol-A (, respectively, their oligomeric and polymeric counterparts, and the like. Methods for the preparation of the aforementioned di- or polyfunctional aromatic compounds are described in British Patent No. 2,043,083. In one embodiment, the flame retardant is added in amounts up to 30 wt. %. In another embodiment, the flame retardant is added in amounts up to 15 wt. %.

In some instances it maybe desired to have flame retardant compositions that are essentially free of halogen atoms, especially bromine and chlorine. "Essentially free of chlorine and bromine" as used herein refers to materials produced without the intentional addition of chlorine, bromine, and/or chlorine or bromine containing materials. It is understood however that in facilities that process multiple products a certain amount of cross contamination can occur resulting in bromine and/or chlorine levels typically on the parts per million by weight scale. With this understanding it can be readily appreciated that essentially free of bromine and chlorine may be defined as having a bromine and/or chlorine content of less than or equal to 100 parts per million by weight (ppm), less than or equal to 75 ppm, or less than or equal to 50 ppm. When this definition is applied to the fire retardant it is based on the total weight of the fire retardant. When this definition is applied to the thermoplastic composition it is based on the total weight of the composition, excluding any filler.

Optionally, inorganic flame retardants may also be used, for example sulfonate salts such as potassium perfluorobutane sulfonate (Rimar salt) and potassium diphenylsulfone sulfonate; salts formed by reacting for example an alkali metal or alkaline earth metal (preferably lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, $BaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. When present, inorganic flame retardant salts are generally present in amounts of from 0.01 to 1.0 parts by weight, more specifically from 0.05 to 0.5 parts by weight, based on 100 parts by weight of the total composition, excluding any filler.

In another embodiment, the filler is a nanofiller, such as a nanotube or nanofiber. Suitable nanofillers include carbon nanotubes. In one embodiment, the carbon nanotubes are single-wall nanotubes while in an alternative embodiment; the carbon nanotubes are multi-wall nanotubes. Other suitable nanofillers that may be used in the present invention include, but are not limited to, nanoclays, nano-alumina and the like.

In still other embodiments, the composition includes one or more smoke suppressants such as metal borate salts for example zinc borate, alkali metal or alkaline earth metal borate or other borate salts. Additionally other of boron containing compounds, such as boric acid, borate esters, boron oxides or other oxygen compounds of boron may be useful. Additionally other flame retardant additives, such as aryl phosphates and brominated aromatic compounds, including polymers containing linkages made from brominated aryl compounds, may be employed. Examples of halogenated aromatic compounds, are brominated phenoxy resins, halogenated polystyrenes, halogenated imides, brominated polycarbonates, brominated epoxy resins and mixtures thereof.

In still other embodiments, the composition may also optionally include a fluoropolymer in an amount of 0.01 to 5.0% fluoropolymer by weight of the composition. The fluoro polymer may be used in any effective amount to provide anti-drip properties to the resin composition. Some possible examples of suitable fluoropolymers and methods for making such fluoropolymers are set forth, for example, in U.S. Pat. Nos. 3,671,487, 3,723,373 and 3,383,092. Suitable fluoropolymers include homopolymers and copolymers that include structural units derived from one or more fluorinated alpha-olefin monomers. The term "fluorinated alpha-olefin monomer" means an alpha-olefin monomer that includes at least one fluorine atom substitutent. Some of the suitable fluorinated alpha-olefin monomers include, for example, fluoro ethylenes such as, for example, $CF_2=CF_2$, $CHF=CF_2$, $CH_2=CF_2$ and $CH_2=CHF$ and fluoro propylenes such as, for example, $CF_3CF=CF_2$, $CF_3CF=CHF$, $CF_3CH=CF_2$, $CF_3CH=CH_2$, $CF_3CF=CHF$, $CHF_2CH=CHF$ and $CF_3CF=CH_2$.

Some of the suitable fluorinated alpha-olefin copolymers include copolymers including structural units derived from two or more fluorinated alpha-olefin monomers such as, for example, poly(tetrafluoro ethylene-hexafluoro ethylene), and copolymers including structural units derived from one or more fluorinated monomers and one or more non-fluorinated monoethylenically unsaturated monomers that are copolymerizable with the fluorinated monomers such as, for example, poly(tetrafluoroethylene-ethylene-propylene) copolymers. Suitable non-fluorinated monoethylenically unsaturated monomers include for example, alpha-olefin monomers such as, for example, ethylene, propylene, butene, acrylate monomers such as for example, methyl methacrylate, butyl acrylate, and the like, with poly(tetrafluoroethylene) homopolymer (PTFE) preferred.

Polymer additives may also be employed in the blends described herein. In some cases a metal oxide may be added to the polymers of the present invention. In some instances the metal oxide may further improve flame resistance (FR) performance by decreasing heat release and increasing the time to peak heat release. Titanium dioxide is of note. Other metal oxides include zinc oxides, boron oxides, antimony oxides, iron oxides and transition metal oxides. Metal oxides that are white may be desired in some instances. Metal oxides may be used alone or in combination with other metal oxides. Metal oxides may be used in any effective amount, in some instances at from 0.01 to 20 wt % of the polymer blend.

In beneficial embodiments of the present invention, the lubricant, heat stabilizer, UV absorber, pigment, dye, colorant, mold release agent, flow promoter, flame retardant additive, smoke suppressant, polymer additive or the like, is a material capable of withstanding the higher processing temperatures capable of being achieved using the compositions of the present invention. In one embodiment, these additives when used in the filled compositions of the present invention have a molecular weight of 500 daltons or greater. In another embodiment, the additives used in the filled compositions of the present invention have a molecular weight of 600 daltons or greater. In still another embodiment, the filler or fillers used in the filled compositions of the present invention have a molecular weight of 700 daltons or greater.

Polymer blends used in articles according to the present invention may also include various additives such as nucleating, clarifying, stiffness and/or crystallization rate agents. These agents are used in a conventional matter and in conventional amounts.

The filled polymer blends used in articles according to the present invention may be blended with the aforementioned ingredients by a variety of methods involving intimate admixing of the materials with any additional additives desired in the formulation. A beneficial procedure includes melt blending, although solution blending is also possible. Because of the availability of melt blending equipment in commercial polymer processing facilities, melt-processing methods are generally utilized. Illustrative examples of equipment used in such melt processing methods include: co-rotating and counter-rotating extruders, single screw extruders, co-kneaders, disc-pack processors and various other types of extrusion equipment.

In some embodiments, for example in certain embodiments wherein films and/or fibers are formed, the composition may be essentially free of fibrous reinforcement such as glass, carbon, ceramic or metal fibers. Essentially free in some instances means less than 5 wt. % of the entire composition. In other embodiments, the composition has less than 1 wt. % fibrous reinforcement present.

In other embodiments, it is beneficial to have compositions that develop some degree of crystallinity on cooling. This may be more beneficial in articles with high surface area such as fibers and films that will cool of quickly due to their high surface area and may not develop the full crystallinity selected to get beneficial properties. In some embodiments, the formation of crystallinity is reflected in the crystallization temperature (Tc), which can be measured by a method such as differential scanning calorimetry (DSC), for example, ASTM method D3418. The temperature of the maximum rate of crystallization may be measured as the Tc. In some embodiments, for example at a cooling rate of 80° C./min., it may be beneficial have a Tc of greater than or equal to 240° C. In other embodiments, for example a slower cooling rate of 20° C./min., a crystallization temperature of greater than or equal to 280° C. may be selected.

In some embodiments, the resin blend and/or composition of the present invention will have at least two distinct glass transition temperatures (Tg), a first Tg from the PAEK resin, or a partially miscible PAEK blend, and a second Tg associated with the polysulfone etherimide resin, or mixture where such resin predominates. These glass transition temperatures (Tgs) can be measured by any convention method such as DSC or dynamic mechanical analysis (DMA). In some embodiments, the first Tg may be from 120 to 200° C. and the second Tg can be from 240 to 350° C. In other embodiments, it may be useful to have an even higher second Tg, from 280 to 350° C. In still other embodiments, depending of the specific resins, molecular weights and composition of the blend, the Tgs may be distinct or the transitions may partially overlap.

In another embodiment the polysulfone etherimide PEAK blends will have melt viscosity that ranges from 200 Pascal-seconds to 10,000 Pascal-seconds (Pa-s) at 380° C. as measured by ASTM method D3835 using a capillary rheometer with a shear rate of 100 to 10000 l/sec. Resin blends having a melt viscosity from 200 Pascal-seconds to 10,000 Pascal-seconds at 380° C. will permit the composition of the invention to be more readily formed into articles of the invention using melt processing techniques. In other embodiments a lower melt viscosity of from 200 to 5,000 Pa-s will be useful.

Another aspect of melt processing, especially at the high temperature needed for the PAEK-polysulfone etherimide compositions described herein, is that the melt viscosity of the composition not undergo excessive change during the molding or extrusion process. One method to measure melt stability is to examine the change in viscosity vs. time at a processing temperature, for example 380° C. using a parallel plate rheometer. In some instances at least 50% on the initial viscosity should be retained after being held at temperature for at least about 10 minutes. In other embodiments the melt viscosity change should be less than about 35% of the initial value for at least about 10 minutes. The initial melt viscosity values may be measured from 1 to 5 minutes after the composition has melted and equilibrated. It is common to wait 1-5 minutes after heat is applied to the sample before measuring (recording) viscosity to ensure the sample is fully melted and equilibrated. Suitable methods for measuring melt viscosity vs. time are, for example, ASTM method D4440. Note that melt viscosity can be reported in poise (P) or Pascal seconds (Pa-s); 1Pa-s=10P.

The filled resin blend compositions of the invention may be formed into articles by any number of methods. Exemplary methods include, for example, injection molding, blow molding, compression molding, profile extrusion, sheet or film extrusion, sintering, gas assist molding, structural foam molding and thermoforming. Examples of such articles include, but are not limited to, membranes, tubing, composites, semi-conductor process tools, wire coatings and jacketing, fluid handling components, cookware, food service items, medical devices, trays, plates, handles, helmets, animal cages, electrical connectors, enclosures for electrical equipment, engine parts, automotive engine parts, bearings, lighting sockets and reflectors, electric motor parts, power distribution equipment, communication equipment, computers and the like, including devices that have molded in snap fit connectors. The filled blends may also be used as fibers. In addition the filled blends may be used as coatings, for example powder coatings. The filled PAEK blends can also be extruded into rods and slabs that can be used to form articles by machining.

Compositions discussed herein may be converted to articles using common thermoplastic processes such as film and sheet extrusion. Film and sheet extrusion processes may include and are not limited to melt casting, blown film extrusion and calendering. Films may range from 0.1 to 1000 microns in some instances. Co-extrusion and lamination processes may be employed to form composite multi-layer films or sheets. Single or multiple layers of coatings may further be applied to the single or multi-layer substrates to impart additional properties such as scratch resistance, ultra violet light resistance, aesthetic appeal, etc. Coatings may be applied through standard application techniques such as rolling, spraying, dipping, brushing, or flow coating. Film and sheet may alternatively be prepared by casting a solution or suspension of the composition in a suitable solvent onto a substrate, belt or roll followed by removal of the solvent. Films may also be metallized using standard processes such as sputtering, vacuum deposition and lamination with foil.

Oriented films may be prepared through blown film extrusion or by stretching cast or calendered films in the vicinity of the thermal deformation temperature using conventional stretching techniques. For instance, a radial stretching pantograph may be employed for multi-axial simultaneous stretching; an x-y direction stretching pantograph can be used to simultaneously or sequentially stretch in the planar x-y directions. Equipment with sequential uniaxial stretching sections can also be used to achieve uniaxial and biaxial stretching, such as a machine equipped with a section of differential speed rolls for stretching in the machine direction and a tenter frame section for stretching in the transverse direction.

Compositions discussed herein may be converted to multiwall sheet including a first sheet having a first side and a second side, wherein the first sheet includes a thermoplastic polymer, and wherein the first side of the first sheet is disposed upon a first side of a plurality of ribs; and a second sheet having a first side and a second side, wherein the second sheet includes a thermoplastic polymer, wherein the first side of the second sheet is disposed upon a second side of the plurality of ribs, and wherein the first side of the plurality of ribs is opposed to the second side of the plurality of ribs.

The films and sheets described above may further be thermoplastically processed into shaped articles via forming and molding processes including but not limited to thermoforming, vacuum forming, pressure forming, injection molding and compression molding. Multi-layered shaped articles may also be formed by injection molding a thermoplastic resin onto a single or multi-layer film or sheet substrate as described below:

1) Providing a single or multi-layer thermoplastic substrate having optionally one or more colors on the surface, for instance, using screen printing of a transfer dye.

2) Conforming the substrate to a mold configuration such as by forming and trimming a substrate into a three dimensional shape and fitting the substrate into a mold having a surface which matches the three dimensional shape of the substrate.

3) Injecting a thermoplastic resin into the mold cavity behind the substrate to (i) produce a one-piece permanently bonded three-dimensional product or (ii) transfer a pattern or aesthetic effect from a printed substrate to the injected resin and remove the printed substrate, thus imparting the aesthetic effect to the molded resin.

Those skilled in the art will also appreciate that common curing and surface modification processes including and not limited to heat-setting, texturing, embossing, corona treatment, flame treatment, plasma treatment and vacuum deposition may further be applied to the above articles to alter surface appearances and impart additional functionalities to the articles. Accordingly, another embodiment of the invention relates to articles, sheets and films prepared from the compositions above.

Without further elaboration, it is believed that one skilled in the art can, using the description herein, utilize the present invention. The following examples are included to provide addition guidance to those skilled in the art of practicing the claimed invention. The examples provided are merely representative of the work and contribute to the teaching of the present invention. Accordingly, these examples are not intended to limit the invention in any manner.

All patents and/or patent applications cited herein are incorporated by reference in their entirety as though set forth in full. The invention is further described in the following illustrative examples in which all parts and percentages are by weight unless otherwise indicated. All ASTM tests and data is from the 2003 edition of the Annual Book of ASTM Standards unless otherwise indicated.

EXAMPLES

Blends are prepared by extrusion of mixtures of the polyaryl ether ketone, PEEK with polysulfone etherimides in a 30 mm twin-screw extruder. Compositions are listed in wt % of the total composition. The extruder was set at about 360 to 425° C. The blends are run at about 200 rpm under vacuum using mild mixing screws. The extrudate is cooled, pelletized and dried at 150-200° C. Test samples are injection molded at a set temperature of 370-430° C. and mold temperature of 120-200° C. using a 30-40 second cycle time.

Some properties are measured using ASTM test methods. All molded samples are conditioned for at least 48 h at 50% relative humidity prior to testing. Reverse notched Izod impact values are measured at room temperature on 3.2 mm thick bars as per ASTM D256. Heat distortion temperature (HDT) is measured at 0.46 MPa (66 psi) on 3.2 mm thick bars as per ASTM D648. Tensile properties are measured on 3.2 mm type I bars as per ASTM method D638. Flexural properties are measured on 3.2 mm bars as per ASTM method D790. Vicat temperature is measured at 50N as per ASTM method D1525. Differential scanning calorimetry (DSC) is run as per ASTM method D3418, but using different heating and cooling rates. Samples are heated at 20° C./min to 350° C. and cooled at either 20 or 80° C./min. to record peak crystallization temperature (Tc). Dynamic Mechanical Analysis (DMA) is run in flexure on 3.2 mm bars at a heating rate of 3° C./min. with an oscillatory frequency of at 1 Hertz. DMA tests are run from about 30 to about 300° C. as per ASTM method D5418. Viscosity vs. shear rate is measured on a capillary rheometer using a 1×0 mm die at 380° C. as per ASTM method D3835. Pellets of the blends are dried at 150° C. for at least 3 hrs before testing using a parallel plate rheometer at 10 radians/sec. the change in melt viscosity at 380° C. is measured vs. time after a 5 minute melting and equilibration period. MVR (melt volume rate) was measured as cc/10 minutes at 380° C.

Materials

PEEK is the polyether ether ketone sold by Victrex Co, as VICTREX 450G.

PEI-1 is a polyetherimide made by reaction of bisphenol-A dianhydride (BPADA) with about an equal molar amount of m-phenylene diamine, sold by General Electric Plastic as ULTEM 1000, Mw ~38,300.

PEI-2 is a polyetherimide made by reaction of bisphenol-A dianhydride (BPADA) with about an equal molar amount of m-phenylene diamine, sold by General Electric Plastic as ULTEM 1010, Mw ~33,200.

PSEI-1 is a polysulfone etherimide made by reaction of 4,4'-oxydiphthalic anhydride (ODPA) with about an equal molar amount of 4,4'-diamino diphenyl sulfone (DDS), Mw ~33,000.

PSEI-2 is a polysulfone etherimide copolymer made by reaction of a mixture of about 80 mole % 4,4'-oxydiphthalic anhydride (ODPA) and about 20 mole % of bisphenol-A dianhydride (BPADA) with about an equal molar amount of 4,4'-diamino diphenyl sulfone (DDS), Mw ~28,000.

PSEI-3 is a polysulfone etherimide made from reaction of bisphenol-A dianhydride (BPADA) with about an equal molar amount of 4,4'-diamino diphenyl sulfone (DDS), Mw ~34,000.

PSEI-4 is a polysulfone etherimide made by reaction of 4,4'-oxydiphthalic anhydride (ODPA) with about an equal molar amount of 4,4'-diamino diphenyl sulfone (DDS), Mw ~15,000. This polysulfone etherimide is polymerized in such a solvent, for example o-dichloro benzene, that the polymer precipitates out prior to reaching the target molecular weight due to insolubility in the solvent. Such a precipitated powder is referred to as a "pre-polymer".

PEI-3 is a polyetherimide made by reaction of bisphenol-A dianhydride (BPADA) with about an equal molar amount of p-phenylene diamine, sold by General Electric Plastic as ULTEM CRS5001.

PPS is a polyphenylene sulfide resin e.g., FORTRON from Ticona, RYTON from Phillips or similar.

PPSU is a polyphenylene sulfone resin e.g., RADEL from Solvay.

Note that letters designate comparative examples while numbers designate examples of the invention.

Examples A, B, 1 & 2

Table 1 shows blends of a crystalline PEEK resin with a polyetherimide (PEI) as well as two polysulfone etherimide (PSEI) resins. Example A shows the properties of the PEEK resin with no added ingredients, note the low HDT at 66 psi. Addition of a 50 wt % polyetherimide gives only a modest increase in the HDT. On the other hand example 1, which blends 40 wt % of a polysulfone etherimide made from reaction of ODPA with DDS (PSEI-1) increases HDT by 94° C. to 245° C. As shown other mechanical properties, for example modulus, strength and reversed Izod impact are increased compared to the appropriate control. A polysulfone etherimide copolymer containing linkages derived from a 80:20 mole % mixture of ODPA:BPADA polymerized with DDS (PSEI-2 resin, example 2) also shows a substantial increase in the 66 psi HDT by over 67° C., to 218° C.

TABLE 1

| | Examples | | | |
|---|---|---|---|---|
| | A | B | 1 | 2 |
| PEEK Victrex 450 G | 100 | 50 | 60 | 50 |
| PEI-1 | 0 | 50 | 0 | 0 |
| PSEI-1 | 0 | 0 | 40 | 0 |

TABLE 1-continued

| | Examples | | | |
|---|---|---|---|---|
| | A | B | 1 | 2 |
| PSEI-2 | 0 | 0 | 0 | 50 |
| Vicat 50 N ° C. | 264 | 169 | >270 | 257 |
| HDT 66 psi ° C. | 151 | 168 | 245 | 218 |
| T. Mod Kpsi | 597 | 534 | 629 | 467 |
| T. Str. Kpsi | 12.9 | 14.4 | 13.0 | 13.4 |
| Flex Mod. Kpsi | 499 | 490 | 519 | 463 |
| Flex. Str. Kpsi | 19.6 | 21.6 | 21.9 | 20.7 |
| RN Izod Impact ft-lbf/in | 19.6 | 40.3 | 39.1 | 40.3 |

FIG. 1 shows the storage modulus of PEEK (example A), a 50:50 PEEK:PEI-1 blend (example B), a 60:40 PEEK:PSEI-1 blend (example 1) and a 50:50 PEEK:PSEI-2 blend (example 2). The unmodified PEEK blend, sample A, shows a very large drop in modulus at the PEEK Tg at about 150° C., dropping from about 2000 to about 190 MPa. Addition of PEI-1 increases the modulus beyond that of the PEEK control A, however after about 180° C. sample B shows a rapid loss of stiffness (modulus) essentially losing all load bearing capability by melting. At temperatures above about 180 C sample B has less load bearing capability then the PEEK control (sample A)

Examples of the invention 1 and 2 show an increase in modulus at temperatures beyond about 150° C. The unblended PEEK resin has modulus at 200° C. of about 189 Mpa while the polysulfone etherimide blends 1 and 2 show a modulus at 200° C. of about 598 and 699 Mpa indicating increased load bearing capability at high temperature. A comparison of the modulus for examples A, B, 1 and 2 at several temperatures is also shown in table 2. Note how the polysulfone etherimide blends with the polyaryl ketone show much higher stiffness at higher temperatures, increasing the load bearing capability of the blend at temperature above, for example 250° C.

TABLE 2

| | Modulus (MPa) | | | |
|---|---|---|---|---|
| Temp. | A | B | 1 | 2 |
| 150 C. | 651 | 2039 | 1243 | 1269 |
| 175 C. | 206 | 772 | 645 | 718 |
| 200 C. | 189 | 8 | 598 | 699 |
| 225 C. | 173 | sample softened | 556 | 645 |
| 250 C. | 173 | sample softened | 556 | 645 |
| 275 C. | 136 | sample softened | 435 | 177 |

Examples C & 3

Table 3 shows blends of PEEK containing 1 wt % of a crystallization agent, talc. Control example C using a PEI with no sulfone linkages, shows a relatively low 66 psi HDT of 169° C. even when the crystallization agent talc is added. The Vicat temperature of control example C is also relatively low at 177° C.

On the other hand, use of the polysulfone etherimide (PSEI-1) in the poly aryl ether ketone blend increases the 66 psi HDT and Vicat temperatures by almost 100° C. over control sample C.

TABLE 3

|  | Examples | |
|---|---|---|
|  | C | 3 |
| PEEK | 49 | 49 |
| PEI-1 | 50 | 0 |
| PSEI-1 | 0 | 50 |
| Talc | 1.0 | 1.0 |
| Vicat 50 N ° C. | 177 | >270 |
| HDT 66 psi | 169 | 262 |
| HDT 264 psi | 160 | 161 |
| T. Str (Y) Mpa | 94.2 | 103.5 |
| T. Mod Mpa | 3474 | 4269 |

The viscosity vs. shear rate and melt volume rate (MVR) for example 3 shown in table 4 was measured on a capillary rheometer at 380° C. with shear rates from 100 to 10,000 l/sec. The PSEI-PEEK blend has a melt viscosity of from 2438 to 223 Pa-s. While this is higher than the control sample C, the PSEI viscosity still shows good melt processability of the high heat load bearing PSEI-PEEK blends, indicating utility for melt forming processes such as fiber and film extrusion and injection molding.

TABLE 4

|  | Examples | |
|---|---|---|
|  | C | 3 |
| Rate 1/sec. | Visc. Pa-s | Visc. Pa-s |
| 100 | 966 | 2438 |
| 200 | 772 | 1865 |
| 640 | 487 | 1106 |
| 1000 | 396 | 883 |
| 2000 | 280 | 606 |
| 5000 | 166 | 351 |
| 10000 | 107 | 223 |
| MVR cc/.10 min | 5.7 | 1.5 |

Viscosity @ 380° C.

The blend of examples 2 and 3 were melted in a parallel plate rheometer and held at 380° C. as a function of time at a constant shear rate of about 10 radian/sec. Viscosity was measured in Pascal-seconds (Pa-s) using a method based on ASTM D4440. The blends were allowed to melt and equilibrate for 5 minutes and then viscosity was recorded. The viscosity recorded after 1 minute, (a total of 6 minutes after the blends was melted and equilibrated, was used a baseline. During time at temperature the blend showed a drop in viscosity as shown in table 5, however even after 10 minutes at 380° C. the blend still retained over 70% of the initial (1 minute) melt viscosity showing acceptable stability for melt processing even at this high temperature. The % retention of the intial one minute viscosity is shown for each example along with the actual viscosity values in Pascal-seconds.

TABLE 5

|  | Example 2 | | Example 3 | |
|---|---|---|---|---|
| Min. @380° C. | Visc. Pa-s | % Original value | Visc. Pa-s | % Original value |
| 1 | 3750 | 100 | 3009 | 100 |
| 3 | 3440 | 91.7 | 2905 | 96.5 |
| 5 | 3280 | 87.4 | 2968 | 98.6 |
| 8 | 2950 | 78.7 | 2979 | 99.0 |
| 10 | 2760 | 73.6 | 2937 | 97.6 |

Examples D, E, F & 4 to 9

Table 6 shows the rate of crystallization for various PEEK blends as measured by differential scanning calorimetry (DSC) with cooling rates of 20 and 80° C./min. Note that the control samples D and E show no detectable crystallization when cooled at 80° C./min. whereas the polysulfone etherimide blends, 4 to 9, all show a crystallization temperatures above 250° C. At the slower cooling rate, 20° C./min., control sample D still does not crystallize. Control sample E was higher PEEK content shows some crystallization at 270° C., but the PSEI blends 4-9 all show a higher crystallization temperature (>280° C.). Note that the blends of PEEK with the ODPA containing polysulfone etherimides, examples 8 & 9, show a crystallization temperature the same or higher than the PEEK polymer with no additive (control sample F).

TABLE 6

|  | Examples | | | | | | | | |
|---|---|---|---|---|---|---|---|---|---|
|  | D | E | F | 4 | 5 | 6 | 7 | 8 | 9 |
| PEEK | 40 | 50 | 100 | 30 | 40 | 60 | 70 | 50 | 60 |
| PEI-2 | 60 | 50 |  |  |  |  |  |  |  |
| PSEI-3 |  |  |  | 70 | 60 | 40 | 30 |  |  |
| PSEI-2 |  |  |  |  |  |  |  | 50 |  |
| PSEI-1 |  |  |  |  |  |  |  |  | 40 |
| Tc 80° C./min | nd | nd | 274 | 255 | 259 | 260 | 270 | 275 | 278 |
| Tc 20° C./min | nd | 270 | 296 | 280 | 283 | 285 | 289 | 296 | 297 | nd = not detected

Examples A, 10 & 11

Table 7 shows blends of a crystalline PEEK resin with a polysulfone etherimide (PSEI-4) resin.

TABLE 7

|  | EXAMPLE | | |
|---|---|---|---|
|  | A | 10 | 11 |
| PEEK (Victrex 450G) | 100 | 60 | 30 |
| PSEI-4 | 0 | 40 | 70 |
| T. Mod. (Kpsi) | 522 | 535 | 550 |
| T. Str (Kpsi) | 14.0 | 15.5 | 16.0 |
| Elong at Yield (%) | 4.7 | 5.5 | 7.0 |
| Flex Mod (Kpsi) | 550 | 560 | 560 |
| Flex Str (Kpsi) | 22 | 24 | 25 |
| NTCH Izod Impact (ft-lbf/in) | 1.6 | 1.3 | 1.5 |
| HDT @ 66 psi (° C.) | 160 | 265 | >270 |
| HDT @ 264 psi (° C.) | 149 | 185 | 245 |

Example 12

A blend of PEEK, PSEI-1 and PEI-3 (60%, 20% and 20% respectively) is made according to the experimental section above for blending polymers. The flow is expected to be better and the HDT lower than Example 1.

Example 13

A blend of PEEK, PSEI-1, PEI-3 and PPS (50%, 20%, 20% and 10% respectively) is made according to the experimental section above for blending polymers. This particular blend is expected to have better flow, slightly lower HDT and require less expense to manufacture than Example 12 in view of the replacement of some PEEK with PPS.

Example 14

A blend of PEEK, PSEI-1, PEI-3, PPS and PPSU (50%, 10%, 10%, 10% and 20% respectively) is made according to the experimental section above for blending polymers. This particular blend is expected to have better impact resistance than Example 13 in view of the replacement of PSEI-1 and PEI-3 with PPSU.

The invention claimed is:

1. A filled polymer blend comprising a mixture of:
from 2 to 99 wt. % of a resin blend comprising:
a first resin component comprising one or more polyaryl ether ketones; and
a second resin component comprising one or more polysulfone etherimides having greater than or equal to 50 mole % of the polymer linkages containing at least one aryl sulfone group and comprising the reaction product of a dianhydride monomer and a diamine monomer,
wherein the ratio of the first component to the second component, in parts by weight is from 99:1 to 60:40;
wherein:
1) the dianhydride monomer is selected from the group consisting of oxydiphthalic anhydrides, bisphenol A dianhydride (BPADA), disulfone dianhydride, bis(carbophenoxy phenyl)hexafluoro propane dianhydride, pyromellitic dianhydride (PMDA), biphenyl dianhydride, and mixtures thereof; and,
2) the diamine monomer is selected from the group consisting of diamino diphenyl sulfone (DDS), m-phenylene diamine (mPD), p-phenylene diamine (pPD), 4,4'-oxydianiline (ODA), 1,3-bis(4-aminophenoxy benzene) and bis(aminophenoxy phenyl)sulfones (BAPS); and
from 1 to 98 wt. % of at least one filler;
wherein the at least one filler has a weight loss (under nitrogen) of 10% or less at 300° C., as determined by thermal gravimetric analyses ASTM method E1868,
wherein the polymer blend has a melt viscosity of 200 to 1000 Pa-s at 380° C., and less than a 50% change in initial melt viscosity after 10 minutes at 380° C., and
wherein the wt. % of resin blend and filler are based upon the combined weight of resin blend and filler.

2. The composition of claim 1 wherein the polysulfone etherimide contains aryl sulfone and aryl ether linkages such that at least 50 mole % of the repeat units of the polysulfone etherimide contain at least one aryl ether linkage, at least one aryl sulfone linkage and at least two aryl imide linkages.

3. The composition of claim 1 wherein at least 50 mole % of the polysulfone etherimide linkages are derived from oxydiphthalic anhydride or bisphenol A dianhydride (BPADA).

4. The composition of claim 1 wherein the second resin component comprises a polymer comprising the reaction product of an dianhydride monomer and a diamine monomer and the 1) dianhydride monomer is 4,4'-oxydiphthalic anhydride (ODPA); and, 2) a diamine monomer selected from the group consisting of diamino diphenyl sulfone (DDS) and bis(aminophenoxy phenyl)sulfones (BAPS).

5. The composition of claim 1 wherein the filler comprises glass fillers and fibers; carbon fillers and fibers; aramid fillers and fibers; metallic fillers and fibers; metal-coated fibers; natural fillers and fibers; minerals; nanofibers and nanofibers; impact modifiers; coupling agents; or blends and/or mixtures including one or more of the foregoing fillers.

6. The composition of claim 1 wherein the ratio of the first component to the second component, in parts by weight is from 85:15 to 75:25.

7. The composition of claim 1, wherein the polymer blend includes from 1 to 75 wt. % of the at least one filler and from 25 to 99 wt. % of the resin blend.

8. The composition of claim 1 wherein the polysulfone etherimide is essentially free of benzylic protons.

9. The composition of claim 1 wherein the polyaryl ether ketone has a crystalline melting point from 300 to 420° C.

10. The composition of claim 1 wherein the polysulfone etherimide has a glass transition temperature (Tg), from 240 to 350° C.

11. The composition according to claim 1 wherein one or more properties of the resin blend is higher than the corresponding property of the first resin component and the second resin component.

12. An article made from the composition of claim 1.

13. The article of claim 12, wherein the article is selected from sheets, films, multilayer sheets, multilayer films, molded parts, extruded profiles, fibers, coated parts, tubing, composites and foams.

14. The composition of claim 1 further comprising an additive comprising lubricants, heat stabilizers, UV absorbers, pigments, dyes, colorants, mold release agents, flow promoters, flame retardants, smoke suppressants, or a combination comprising at least one of the foregoing additives, wherein the additive has a molecular weight of 500 daltons or greater.

15. The composition of claim 1 wherein less than 30 mole % of the polysulfone etherimide linkages contain isoalkylidene groups.

16. The composition of claim 15 wherein less than 10 mole % of the polysulfone etherimide linkages contain isoalkylidene groups.

17. The composition of claim 15 wherein less than 20 mole % of the polysulfone etherimide linkages contain isoalkylidene groups.

* * * * *